US009084300B2

(12) United States Patent
Kataoka et al.

(10) Patent No.: US 9,084,300 B2
(45) Date of Patent: Jul. 14, 2015

(54) INDUCTION COOKING DEVICE

(75) Inventors: Akira Kataoka, Hyogo (JP); Takaaki Kusaka, Hyogo (JP); Kazunori Takechi, Hyogo (JP)

(73) Assignee: Panasonic Intellectual Property Mangement Co., Ltd. (JP)

( * ) Notice: Subject to any disclaimer, the term of this patent is extended or adjusted under 35 U.S.C. 154(b) by 181 days.

(21) Appl. No.: 12/921,667

(22) PCT Filed: Feb. 6, 2009

(86) PCT No.: PCT/JP2009/000466
§ 371 (c)(1),
(2), (4) Date: Sep. 9, 2010

(87) PCT Pub. No.: WO2009/113235
PCT Pub. Date: Sep. 17, 2009

(65) Prior Publication Data
US 2011/0011851 A1    Jan. 20, 2011

(30) Foreign Application Priority Data

Mar. 10, 2008  (JP) ................. 2008-059197
Mar. 11, 2008  (JP) ................. 2008-061319

(51) Int. Cl.
*H05B 6/12*  (2006.01)
(52) U.S. Cl.
CPC ............ *H05B 6/1218* (2013.01); *H05B 6/1272* (2013.01); *Y02B 40/123* (2013.01); *Y02B 40/126* (2013.01)
(58) Field of Classification Search
CPC .. H05B 6/1218; H05B 6/1272; Y02B 40/123; Y02B 40/126
USPC .............. 219/620–625, 627, 506, 445.1, 453, 219/464, 465, 626, 647, 661; 126/39, 39 H
See application file for complete search history.

(56) References Cited

U.S. PATENT DOCUMENTS 5,893,996 A * 4/1999 Gross et al. ................. 219/447.1
7,041,945 B2 * 5/2006 Aihara et al. ................. 219/622
(Continued)

FOREIGN PATENT DOCUMENTS

EP   1 418 384 A2   5/2004
JP   58-074791 U1   5/1983
(Continued)

OTHER PUBLICATIONS

International Preliminary Report on Patentability for International Application No. PCT/JP2009/000466, dated Oct. 12, 2010, 5 pages.
(Continued)

*Primary Examiner* — Dana Ross
*Assistant Examiner* — Joseph Iskra
(74) *Attorney, Agent, or Firm* — Brinks Gilson & Lione

(57) ABSTRACT

An induction cooking device includes a control unit and a plurality of light-emitting parts. The control unit includes a heating control unit that controls the output of an inverter circuit and a light-emission control unit that controls the light emission. When receiving a command for starting with one heating coil, the control unit turns on only the light-emitting parts provided near the outer circumference of the heating coil for starting heating, and when receiving a command for starting heating with two or more adjacent heating coils, the control unit turns off the light-emitting parts disposed between the heating coils for starting heating among the light-emitting parts provided near the outer circumference of each one of the heating coils for starting heating, and turns on the remaining light-emitting parts.

9 Claims, 23 Drawing Sheets

(56) References Cited

U.S. PATENT DOCUMENTS

| | | | |
|---|---|---|---|
| 7,402,781 B2* | 7/2008 | Kondo et al. | 219/622 |
| 7,425,690 B2 | 9/2008 | Schilling | |
| 7,554,060 B2* | 6/2009 | England et al. | 219/480 |
| 2003/0057200 A1* | 3/2003 | Ogata et al. | 219/622 |
| 2003/0164370 A1 | 9/2003 | Aihara et al. | |
| 2004/0089466 A1* | 5/2004 | Schilling et al. | 174/66 |
| 2004/0144778 A1* | 7/2004 | Kawai | 219/739 |
| 2007/0262072 A1 | 11/2007 | Schilling | |

FOREIGN PATENT DOCUMENTS

| | | |
|---|---|---|
| JP | 59-114789 A | 7/1984 |
| JP | 62-043092 A | 2/1987 |
| JP | 63-164196 U1 | 10/1988 |
| JP | 02-095192 U1 | 7/1990 |
| JP | 2001-297863 A | 10/2001 |
| JP | 2005-100998 A | 4/2005 |
| JP | 2008-527294 A | 7/2006 |
| JP | 2007-026789 A | 2/2007 |
| JP | 2008-293871 A | 12/2008 |
| JP | 2009-006048 A | 1/2009 |
| JP | 4768751 B2 | 6/2011 |

OTHER PUBLICATIONS

International Search Report for International Application No. PCT/JP2009/000466, dated May 19, 2009, 2 pages.

Extended European Search Report in corresponding European Application No. 09 71 9217.3, dated Feb. 3, 2014, 8 pages.

\* cited by examiner (USER'S SIDE)

INDUCTION COOKING DEVICE

This application is a 371 application of PCT/JP2009/000466 filed on Feb. 6, 2009, which claims priority to JP2008-059197 filed on Mar. 10, 2008 and JP2008-061319 filed on Mar. 11, 2008, the entire contents of which are incorporated herein by reference.

TECHNICAL FIELD

The present invention relates to an induction cooking device which indicates a position for placing a target heating object on a top plate.

BACKGROUND ART

An induction heating device for heating a target heating object such as a pan inductively using a heating coil is recently widely spread as its excellent features such as safety, cleanliness, and high efficiency has come to be recognized. Patent Citation 1 discloses an induction cooking device capable of indicating a portion of a heating coil or the vicinity of an outer circumference of the heating coil by indicating means when a power source is turned on. Thus, the user can see whether the power source is turned on or not, and recognize a position (a heating unit) where the target heating object should be placed. Accordingly, it makes the device very convenient.

Patent Citation 1: JP 2001-297863 A

Technical Problem

In Patent Citation 1, the induction cooking device is configured as that the indicating means can indicate the vicinity of the outer circumference of a heating coil such that one heating coil corresponds to one heated portion. In such configuration, for example, when a target heating object large in pan bottom diameter is placed on concentrically-arranged two heating coils and heated, two heating portions both have to be displayed. Also in case where an oval pan (an elliptical pan) is placed on non-concentrically and adjacently arranged two heating coils, two heating portions have to be displayed separately. Thus, when a user intends to heat one target heating object using two or more heating coils, the user can not surely know where to place the target heating object.

SUMMARY OF THE INVENTION

The present invention is intended to solve the above mentioned problem. Hence, it is an object of the present invention to provide an induction cooking device being capable of heating one target heating object using two or more heating coils that can distinctively indicate the site of a heated portion(s).

Technical Solution

The induction cooking device of the invention includes a top plate formed of a light permeable material, a plurality of heating coils disposed beneath the top plate being operable to generate an alternating-magnetic field and heat a target heating object placed on the top plate inductively, an inverter circuit being operable to supply a high-frequency current to the heating coils, a control unit being operable to control the inverter circuit, an operation unit being operable to enter and operate commands for heating control of the target heating object, and a plurality of light-emitting parts provided near the outer circumference of the heating coils, in which the control unit has a heating control unit being operable to control the output of the inverter circuit and a light-emission control unit being operable to control the light emission of the light-emitting parts, depending on the input from the operation unit, and the control unit, when receiving a command from the operation unit for starting heating of one target heating object by one heating coil, turns on only the light-emitting parts provided near the outer circumference of the heating coil for starting heating, and when receiving a command from the operation unit for starting heating of one target heating object by two or more adjacent heating coils having the centers at different positions, turns off the light-emitting parts disposed between the heating coils for starting heating, out of the light-emitting parts provided near the outer circumference of each heating coil for starting heating, and turns on the other light-emitting parts other than the turned off light-emitting parts.

The induction cooking device of the invention includes a top plate formed of a light permeable material, a plurality of heating coils disposed beneath the top plate being operable to generate an alternating-magnetic field and heat a target heating object placed on the top plate inductively, a control unit being operable to control an inverter circuit, an inverter circuit being operable to supply a high-frequency current to the heating coils, an operation unit being operable to enter and operate commands for heating control of the target heating object, and a plurality of light-emitting parts provided near the outer circumference of the heating coils, in which the control unit has a heating control unit being operable to control the output of the inverter circuit and a light-emission control unit being operable to control the light emission of the light-emitting parts, depending on the input from the operation unit, and each one of the light-emitting parts includes a two-color light-emitting element, and the control unit lights all the light-emitting parts in a first color when the light source of the main body is turned on by the operation unit, lights only the light-emitting parts provided near the outer circumference of the heating coil for starting heating in a second color when a command for starting heating of one target heating object by one heating coil is received from the operation unit, lights the light-emitting parts disposed between heating coils for starting heating in the first color, out of the light-emitting parts provided near the outer circumference of each one of the heating coils for starting heating, and lights the other light-emitting parts in the second color except for the light-emitting parts lighting in the first color when a command is received from the operation unit for heating one target heating object by two or more adjacent heating coils having the centers at different positions, and turns off all the light-emitting parts when the power source of the main body is turned off by the operation unit.

The induction cooking device of the invention includes a top plate formed of a light permeable material, a plurality of heating coils being operable to generate an alternating-magnetic field and heat a target heating object placed on the top plate inductively, a control unit being operable to control the current flowing in the heating coil, an operation unit being operable to enter and operate commands for heating control of the target heating object, and a plurality of light-emitting parts provided near the outer circumference of the heating coils, in which the control unit has a heating control unit being operable to supply a high-frequency current to the heating coils and a light-emission control unit being operable to control the light emission of the light-emitting parts, depending on the input from the operation unit, and also has a heating area sequential display mode for lighting up the light-emitting parts, for operating the plurality of heating units in cooperation, and sequentially lighting the vicinity of the outer circumference of the heating coil to be operated alone, while stopping the operation of the plurality of heating coils, and the vicinity of the outer circumference of the plurality of heating coils to be operated in cooperation, when the power source of the main body is turned on by the operation unit.

Advantageous Effects

The induction cooking device of the invention, when heating one target heating object by means of a plurality of heating coils, does not turn on the light-emitting parts disposed between the plurality of heating coils and turns on only the light-emitting parts disposed near the outer circumference of one heating coil that is constituted of the plurality of heating coils which are combined together to be regarded as one heating coil. Accordingly, if a plurality of heating units is combined in use when heating the target heating object, the combined heating unit is displayed, and the user easily recognizes where to put on the target heating object.

The induction cooking device of the invention has a heating unit for heating including two or more heating coils, and after the power source is turned on, the vicinity of the outer circumference of the plurality of heating units is illuminated sequentially. As a result, the user can recognize the type of heating units (size and position) before heating. Moreover, in the induction cooking device of the invention, when a start command of heating is entered, the vicinity of the outer circumference of the corresponding heating unit is illuminated. Hence, if one object is heated by two or more heating coils, since the vicinity of the outer circumference of cooperating heating coils is illuminated, the user easily recognizes where to put on the target heating object.

EXPLANATION OF REFERENCE

Figure 1:
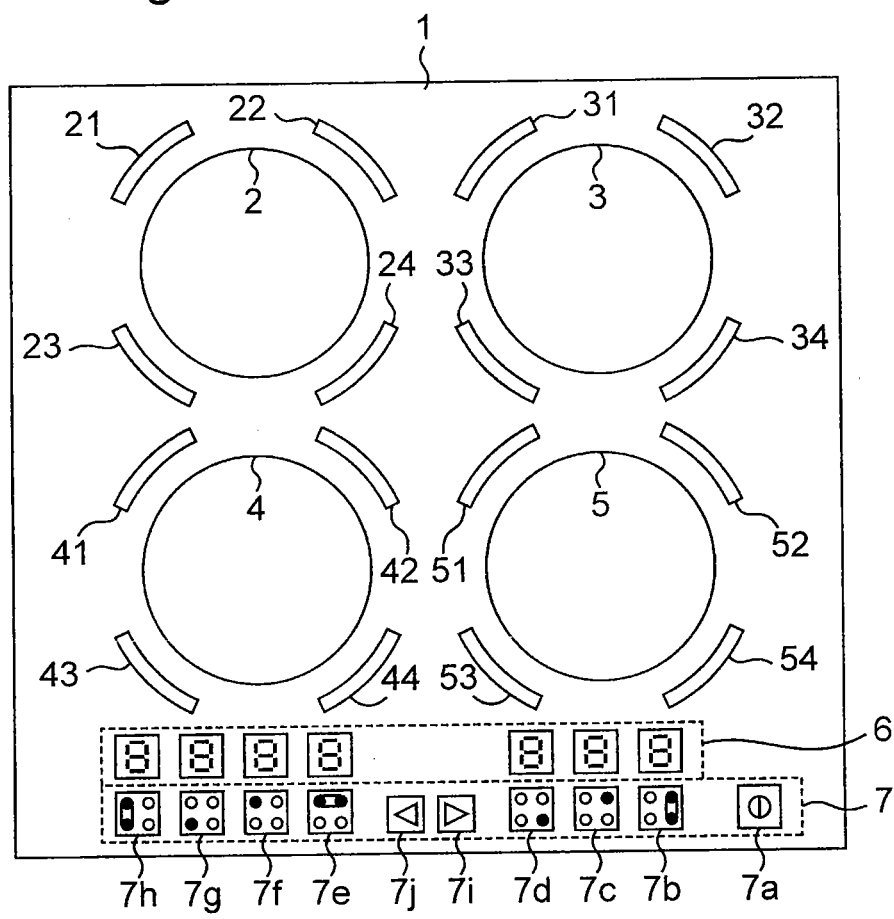
FIG. 1 is a top view of an induction cooking device in preferred embodiment 1 of the invention.

1: top plate
2-5, 2*b*, 3*b*, 4*b*: heating unit
6, 6*k*: display unit
7, 7*k*: operation unit
8, 8*a*, 8*b*: target heating object
9, 9*a*, 9*b*: heating coil
10, 10*a*: inverter circuit
11: control unit
11*a*: heating control unit
11*b*: light-emission control unit
12: circuit board
13, 13*a*, 13*b*: LED
14: light guide tube
15: power switch
16: power source
17: input current detector
18: load checking unit
21-24, 21*a*-24*a*, 21*b*-24*b*, 31-34, 31*a*-34*a*, 41-44, 41*a*-44*a*, 41*b*-44*b*, 51-54, 51*a*-54*a*, 61-66: light-emitting part

DETAILED DESCRIPTION OF THE PREFERRED EMBODIMENTS

Below, preferred embodiments of the invention are specifically described while referring to the accompanying drawings. In the following preferred embodiments, similar constituent elements are identified with same reference numerals.

Preferred Embodiment 1

Configuration of Induction Cooking Device

FIG. 1 is a top view of an induction cooking device in preferred embodiment 1 of the invention. At the upper part of the induction cooking device of the preferred embodiment, a top plate 1 of crystallized ceramic being capable of transmitting light is provided, and on the upper side or lower side of the top plate 1, a first heating unit 2, a second heating unit 3, a third heating unit 4, and a fourth heating unit 5 are provided, on which the target heating object (object to be heated) is placed and heated. The region of each heating unit is indicated by printing. Although not shown in FIG. 1, heating coils are provided beneath the top plate 1, at positions corresponding to the first to fourth heating units 2, 3, 4, and 5. These plural heating coils have their centers at different positions. At the front side (the user's side) of the top plate 1, a display unit 6 and an operation unit 7 are provided. The operation unit 7 includes a power key 7a for turning on and off the power source, heating keys 7b, 7c, 7d, 7e, 7f, 7g, and 7h for turning on and off the heating, and heat level adjusting keys 7i, and 7j. The display unit 6 includes seven heat level display units corresponding to the seven heating keys 7b to 7h. The heat level display unit indicates the heat level of the heating unit printed on the corresponding heating key in numerical figures. Further, near the outer circumference of the heating units 2, 3, 4, and 5, light-emitting parts 21-24, 31-34, 41-44, and 51-54 are provided. Four light-emitting parts are provided for one heating unit.

Figure 2:
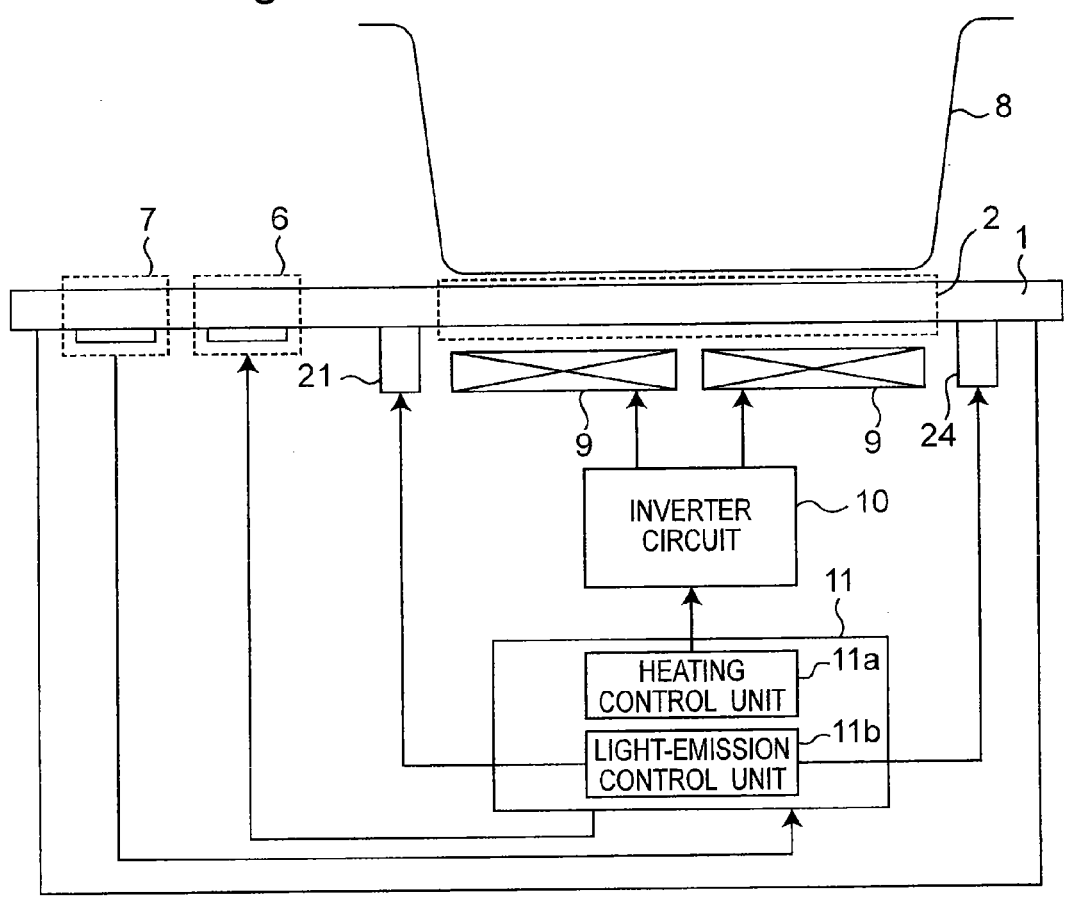
FIG. 2 is a configuration diagram of the induction cooking device in preferred embodiment 1 of the invention.

FIG. 2 shows a configuration of the induction cooking device in preferred embodiment 1 of the invention. In FIG. 1, four heating units 2, 3, 4, and 5 are shown, but in FIG. 2, only one heating unit 2 is shown for the convenience of explanation. The induction cooking device of the preferred embodiment includes the top plate 1, a heating coil 9 provided beneath the top plate 1 at a position corresponding to the heating unit 2, for heating the target heating object 8 by induction heating, an inverter circuit 10 disposed beneath the heating coil 9 for supplying a high-frequency current to the heating coil 9, the display unit 6, and the operation unit 7. Further, the induction cooking device of the preferred embodiment includes light-emitting parts 21 and 24 (light-emitting pats 22 and 23 not shown) provided near the outer circumference of the heating coil 9, and a control unit 11 for controlling the entire induction cooking device. The control unit 11 includes a heating control unit 11a for issuing a control signal to the inverter circuit 10 in order to control the high-frequency current to be supplied to the heating coil 9, and a light-emission control unit 11b for illuminating the light-emitting parts 21 to 24.

Figure 3:
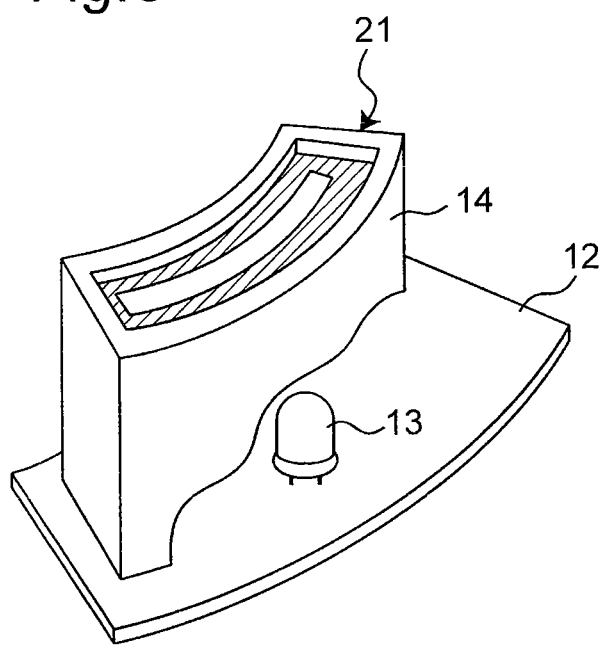
FIG. 3 is a configuration diagram of a light-emitting part of the induction cooking device in preferred embodiment 1 of the invention.

FIG. 3 shows a configuration of the light-emitting part 21. On a circuit board 12, one light-emitting diode (LED) 13 is provided, and the light emitted from the LED 13 is transmitted within a light guide tube 14 and is issued from the upper part of the light guide tube 14. This light illuminates the vicinity of the outer circumference of the heating unit on the top plate 1 as shown in FIG. 1 by way of the top plate 1.

<Operation of Induction Cooking Device>

The induction cooking device of the preferred embodiment illuminates the light-emitting parts provided near the outer circumference of the heating coil to be operated when heating the target heating object, and when heating one target heating object by a plurality of heating coils, the light-emitting parts disposed between the plural heating coils is not illuminated, but only one light-emitting part provided near the outer circumference of one heating coil composed of a plurality of heating coils (hereinafter called a combined heating coil) is illuminated.

Figure 4:
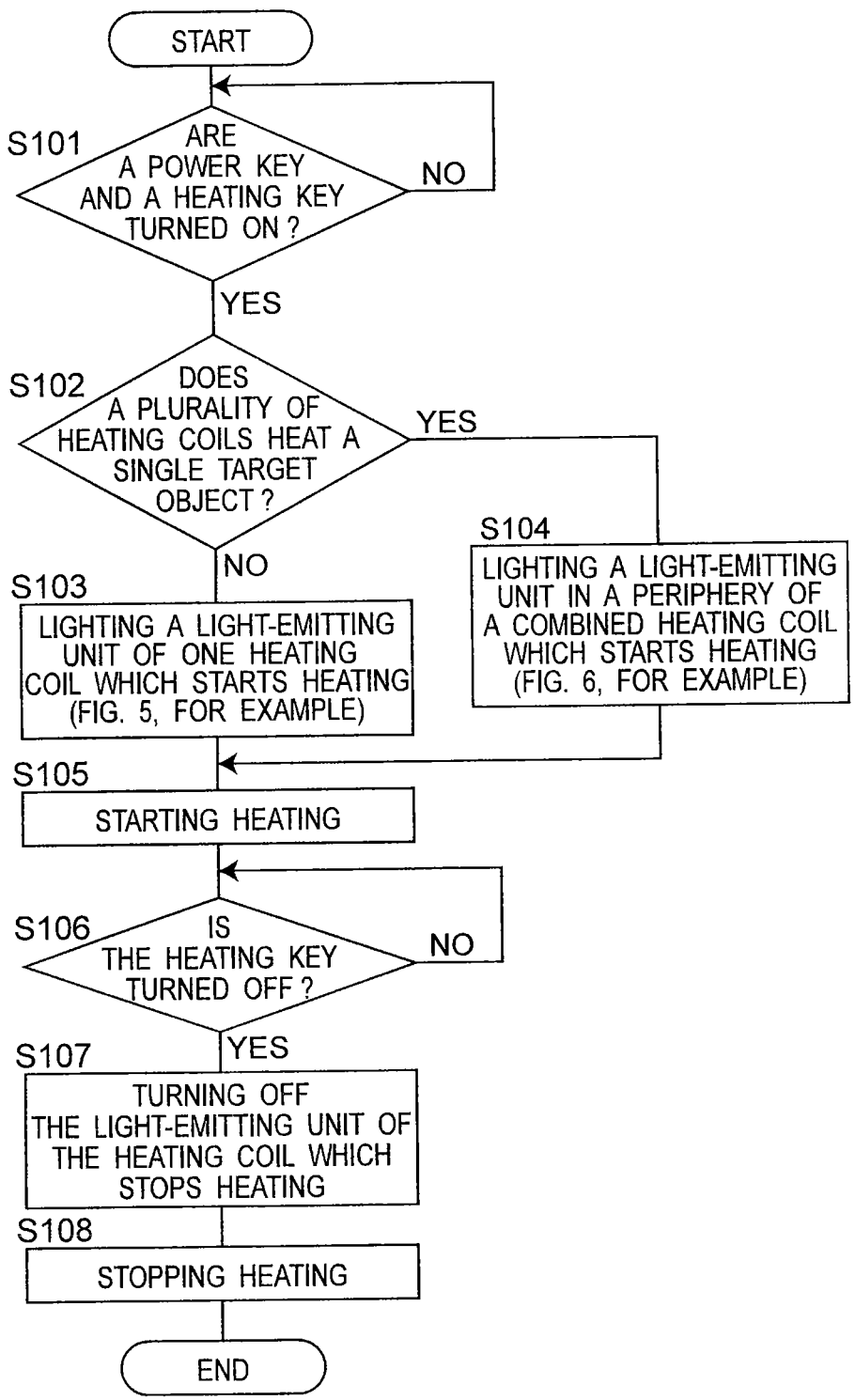
FIG. 4 is a flowchart of operation control of the light-emitting parts of the induction cooking device in preferred embodiment 1 of the invention.
Figure 5:
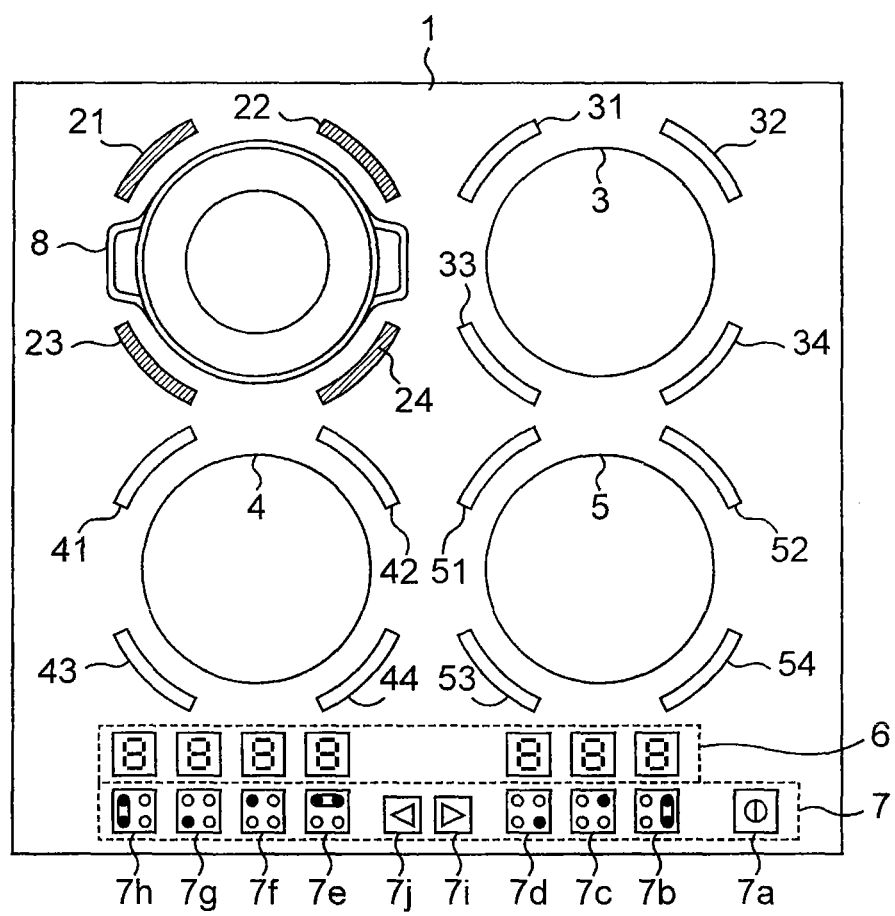
FIG. 5 is a diagram of lighting example of the light-emitting parts when the heating key 7*f* is turned on in preferred embodiment 1 of the invention.

FIG. 4 is a flowchart of operation control of the light-emitting parts of the induction cooking device in preferred embodiment 1 of the invention. When the power key 7a is in off state, the light-emission control unit 11b turns off all the light-emitting parts. When the user turns on the power key 7a, and the heating key is turned on (Yes at S101), the light-emission control unit 11b judges whether to heat one target heating object by the plurality of heating coils or not (S102). Specifically, when any one of the heating keys 7b, 7e, and 7h (FIG. 1) is turned on, the light-emission control unit 11b judges to heat one target heating object to be heated by a plurality of heating coils, and when any one of the heating keys 7c, 7d, 7f, and 7g (FIG. 1) is turned on, the light-emission control unit 11b judges to heat one target heating object by one heating coil. When the light-emission control unit 11b judges to heat one target heating object by one heating coil (No at S102), the light-emission control unit 11b turns on all the four light-emitting parts provided near the outer circumference of one heating coil to start heating (S103). A specific example is shown in FIG. 5. FIG. 5 is a diagram showing a lighting example of the light-emitting parts when the heating key 7f is turned on. The illuminated portions are indicated by shaded areas. The target heating object 8 is placed on the heating unit 2, and the light-emission control unit 11b lights the light-emitting parts 21 to 24 near the outer circumference of the heating unit 2.

Figure 6:
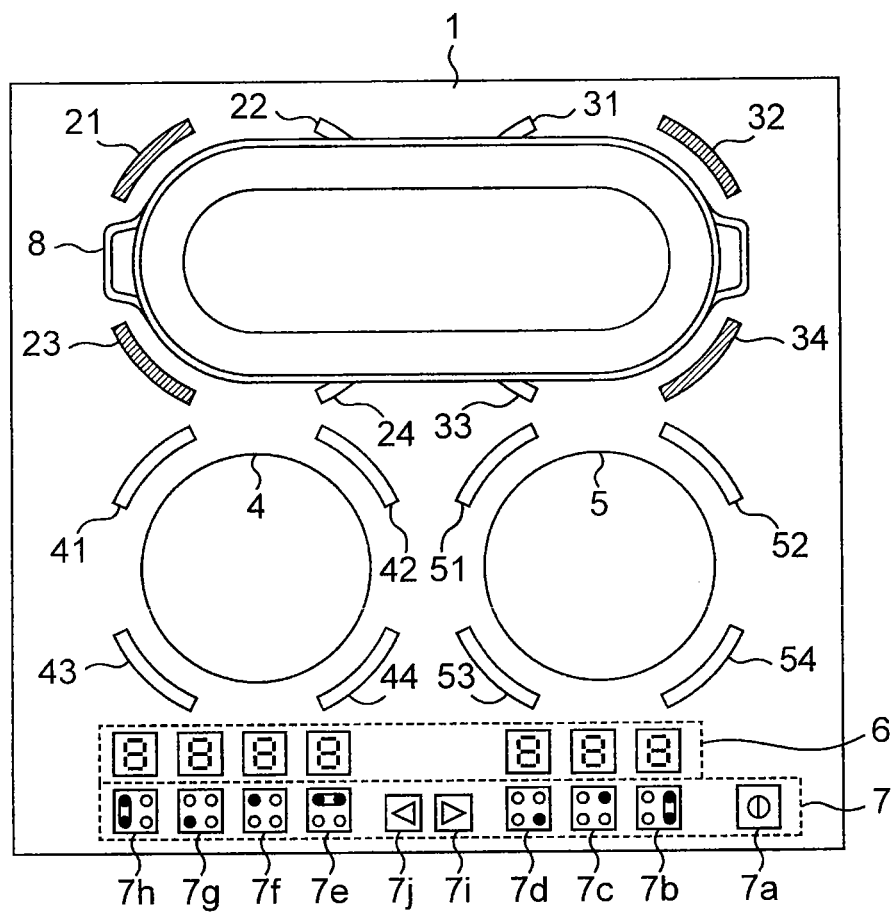
FIG. 6 is a diagram of lighting example of the light-emitting parts when the heating key 7*e* is turned on in preferred embodiment 1 of the invention.

On the other hand, when the light-emission control unit 11b judges to heat one target heating object by a plurality of heating coils (Yes at S102), the light-emission control unit 11b turns on four light-emitting parts provided near the outer circumference of the combined heating coil for starting heating (S104). The light-emission control unit 11b does not turn on the light-emitting parts disposed between plural heating coils for starting heating. A specific example is shown in FIG. 6. FIG. 6 is a lighting example of the light-emitting parts when the heating key 7e is turned on. The illuminated portions are indicated by shaded areas. The target heating object 8 of oval shape is put on the heating units 2 and 3. The light-emission control unit 11b turns on only the light-emitting parts 21, 23, 32, and 34 provided near the outer circumference of the combined heating coil (a combination of the heating coil corresponding to the heating unit 2 and the heating coil corresponding to the heating unit 3), and does not light the light-emitting parts 22, 24, 31, and 33 disposed between the heating coil corresponding to the heating unit 2 and the heating coil corresponding to the heating unit 3.

The heating control unit 11a controls to supply a high-frequency current to the heating coil on the basis of the input from the user (S105). Then, when the user turns off the heating key (Yes at S106), the light-emission control unit 11b turns off the light-emitting parts of the heating coil for finishing heating (S107). The heating control unit 11a stops supply of high-frequency current to the heating coil (S108).

The induction cooking device of the preferred embodiment turns on the light-emitting parts provided near the outer circumference of the heating coil to be operated when heating the target heating object, but when heating one target heating object by a plurality of heating coils, the light-emitting parts disposed between the plural heating coils are not illuminated, but only the light-emitting parts provided near the outer circumference of the combined heating coil are illuminated. Therefore, when heating the target heating object, even if a plurality of heating units are combined and used, the outer circumference of the combined heating units is displayed, and the user can easily recognize where to put on the target heating object. If the user pushes another heating key by mistake, the heating unit for starting heating is precisely displayed on the top plate, and the user can notice the error easily.

Modified Example 1

Figure 7:
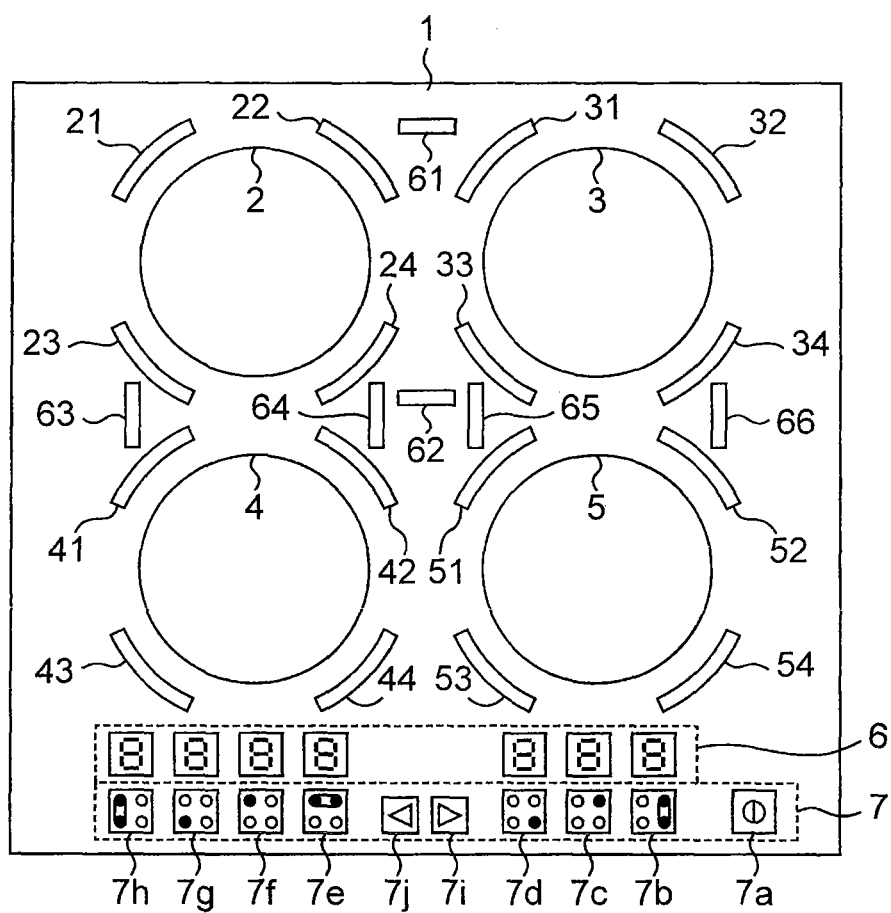
FIG. 7 is a top view of an induction cooking device in modified example 1 of preferred embodiment 1 of the invention.
Figure 8:
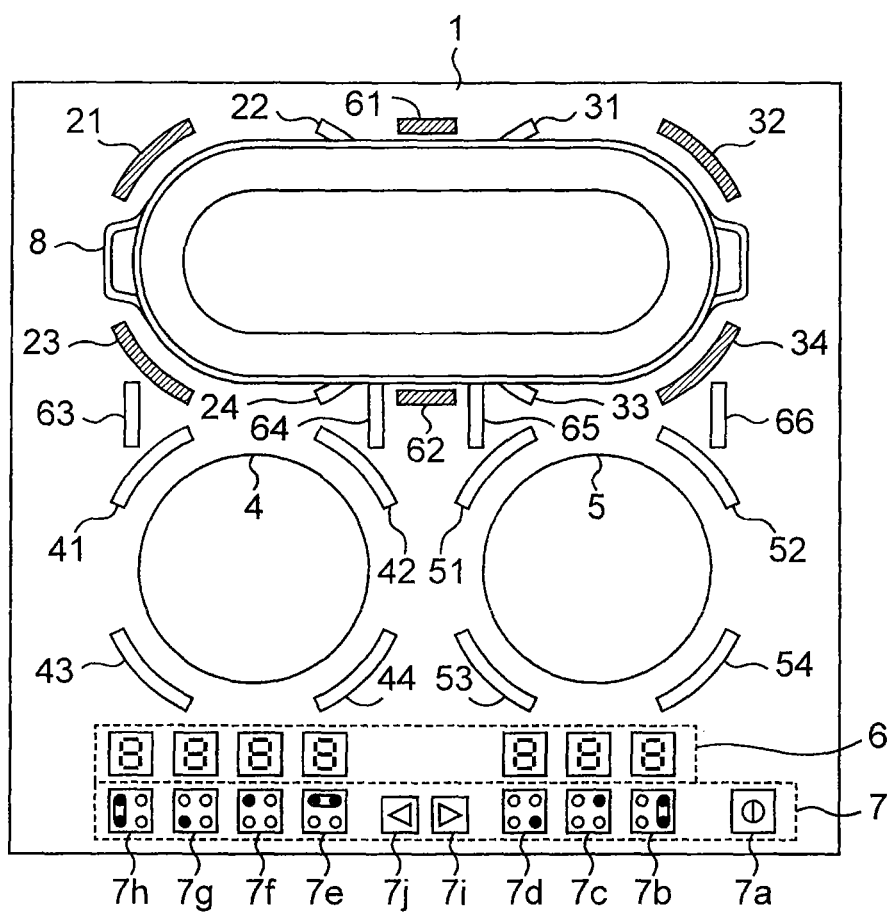
FIG. 8 is a diagram of lighting example of the light-emitting parts when the heating key 7*e* is turned on in modified example 1 in preferred embodiment 1 of the invention.

In the preferred embodiment, as shown in FIG. 1, in one heating coil, four light-emitting parts are provided near the outer circumference thereof. Further, as shown in FIG. 7, light emitting parts 61 and 62 may be provided between the heating units 2 and 3, light-emitting parts 63 and 64 may be provided between the heating units 2 and 4, and light-emitting parts 65 and 66 may be provided between the heating units 3 and 5. In this case, when heating one target heating object by a plurality of heating coils, the light-emission control unit 11b turns on the six light-emitting parts provided near the outer circumference of the combined heating coil for starting heating (including two light-emitting parts out of light-emitting parts 61 to 66) (step S104 in FIG. 4). A specific example is shown in FIG. 8. FIG. 8 shows a lighting example of the light-emitting parts when the heating key 7e is turned on in modified example 1. The illuminated portions are indicated by shaded areas. The target heating object 8 of oval shape is placed on the heating units 2 and 3. The light-emission control unit 11b turns on the light-emitting parts 21, 23, 32, 34, 61, and 62 provided near the outer circumference of the combined heating coil (a combination of the heating coil corresponding to the heating unit 2 and the heating coil corresponding to the heating unit 3), but does not light the light-emitting parts 22, 24, 31, and 33 disposed between the heating coil corresponding to the heating unit 2 and the heating coil corresponding to the heating unit 3. As a result, if a plurality of heating units are combined and used, the user can recognize the heating unit more correctly.

Modified Example 2

In this preferred embodiment, as shown in FIG. 1, the length of one light-emitting part is set at ⅛ of the circumference near the outer circumference of the heating unit, but the length of one light-emitting part may be set at ¼ of the circumference as shown in FIG. 9(a). Hence, when turning on up all the four light-emitting parts provided near the outer circumference of one heating coil (for example, light-emitting pats 21a, 22a, 23a, and 24a), the four light-emitting parts look like linked, and a circumference is displayed. A specific example is shown in FIG. 9(b). FIG. 9(b) shows a lighting example of the light-emitting parts when the heating key 7e is turned on in modified example 2. The illuminated portions are indicated by shaded areas. The target heating object 8 of oval shape is placed on the heating units 2 and 3. The light-emission control unit 11b turns on the light-emitting parts 21a, 23a, 32a, and 34a provided near the outer circumference of the combined heating coil (a combination of the heating coil corresponding to the heating unit 2 and the heating coil corresponding to the heating unit 3), but does not light the light-emitting parts 22a, 24a, 31a, and 33a disposed between the heating coil corresponding to the heating unit 2 and the heating coil corresponding to the heating unit 3.

Preferred Embodiment 2

Configuration of Induction Cooking Device

Figure 10:
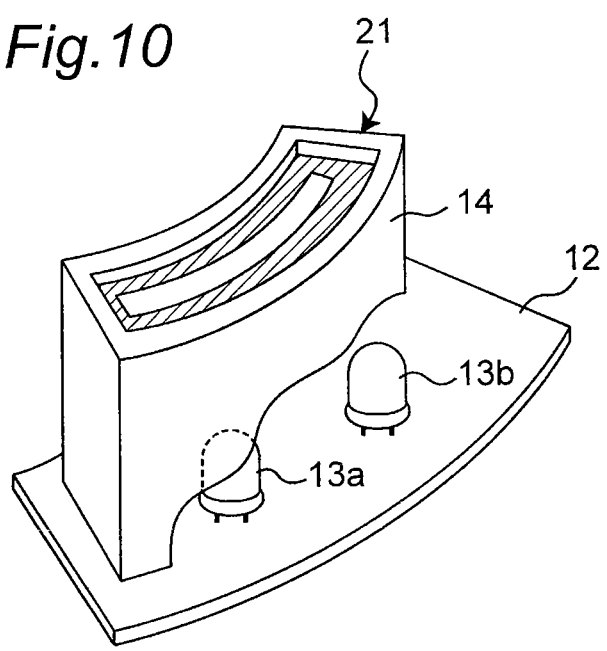
FIG. 10 is a configuration diagram of a light-emitting part of an induction cooking device in preferred embodiment 2 of the invention.

This preferred embodiment relates to an induction cooking device for displaying the position of the heating unit in two colors. The configuration of the induction cooking device of this preferred embodiment is the same as in preferred embodiment 1 shown in FIG. 1 and FIG. 2, and the explanation is omitted. FIG. 10 shows a configuration of a light-emitting part 21 of the induction cooking device in preferred embodiment 2. On a circuit board 12, two monochromatic LEDs 13a and 13b of different colors are provided, and the light emitted from each of the LED 13a or 13b is transmitted within a light guide tube 14 and illuminated in the upper part of the light guide tube 14. This light passes through the top plate 1, and displays the vicinity of the outer circumference of the heating unit on the top plate 1 as shown in FIG. 1. In this preferred embodiment, the colors of the LED 13a and 13b are white and red, respectively.

<Operation of Induction Cooking Device>

The induction cooking device of the preferred embodiment lights all the light-emitting parts in white when the power source is turned on, and when heating the target heating object, the light-emitting part provided near the outer circumference of the heating coil to be operated is lighted in red, but when heating one target heating object by a plurality of heating coils, while the light-emitting parts disposed between the plural heating coils are lighted in white, only the light-emitting parts provided near the outer circumference of the combined heating coil are lighted in red.

Figure 11:
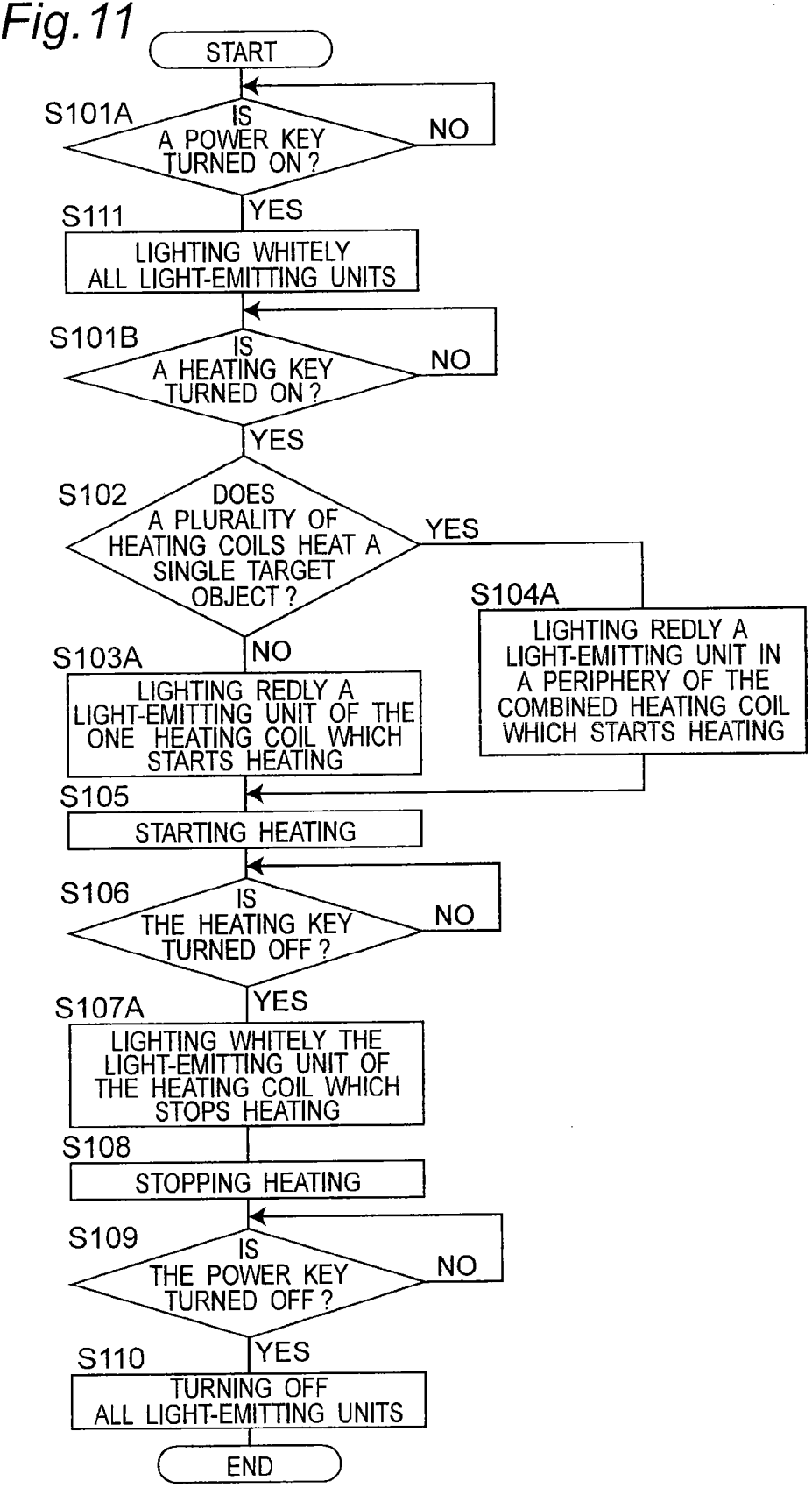
FIG. 11 is a flowchart of operation control of the light-emitting parts of the induction cooking device in preferred embodiment 2 of the invention.

FIG. 11 shows a flowchart of operation control of the light-emitting parts by the induction cooking device in preferred embodiment 2 of the invention. When the power key 7a is in off state, the light-emission control unit 11b turns off all the light-emitting parts. When the user turns on the power key 7a (Yes at S101A), the light-emission control unit 11b lights all the light-emitting parts 21-24, 31-34, 41-44, and 51-54 in white (S111). Then, when the user turns on the heating key (Yes at S101B), the light-emission control unit 11b judges whether to heat one target heating object by a plurality of heating coils or not (S102). More specifically, when any one of the heating keys 7b, 7e, and 7h (FIG. 1) is turned on, the light-emission control unit 11b judges to heat one target heating object by a plurality of heating coils, and when any one of the heating keys 7c, 7d, 7f, and 7g (FIG. 1) is turned on, it judges to heat one target heating object by one heating coil. When the light-emission control unit 11b judges to heat one target heating object by one heating coil (No at S102), the light-emission control unit 11b lights the four light-emitting parts provided near the outer circumference of one heating coil for starting heating in red (S103A). A specific example is shown in FIG. 5. FIG. 5 shows a lighting example of the light-emitting parts when the heating key 7f is turned on. The portions lighted in red are indicated by shaded areas. The target heating object 8 is put on the heating unit 2. The light-emission control unit 11b lights the light-emitting parts 21-24 near the outer circumference of the heating unit 2 in red, and continues to light the light-emitting parts 31-34, 41-44, and 51-54 near the outer circumference of the other heating units 3, 4, and 5 in white.

On the other hand, when the light-emission control unit 11b judges to heat one target heating object by a plurality of heating coils (Yes at S102), the light-emission control unit 11b lights the four light-emitting parts provided near the outer circumference of the combined heating coil for starting heating in red (S104A). The light-emission control unit 11b continues to light the light-emitting parts disposed between plural heating coils in white. A specific example is shown in FIG. 6. FIG. 6 shows a lighting example of the light-emitting parts when the heating key 7e is turned on. The portions lighted in red are indicated by shaded areas. The target heating object 8 of oval shape is put on the heating pars 2 and 3. The light-emission control unit 11b turns on only the light-emitting parts 21, 23, 32, and 34 provided near the outer circumference of the combined heating coil (a combination of the heating coil corresponding to the heating unit 2 and the heating coil corresponding to the heating unit 3). The light-emission control unit 11b continues to light the light-emitting parts 22, 24, 31, and 33 disposed between the heating coil corresponding to the heating unit 2 and the heating coil corresponding to the heating unit 3, and the light-emitting parts 41-44, and 51-54 near the outer circumference of the other heating units 4 and 5 in white. The light-emitting parts 22, 24, 31, and 33 disposed between the heating coil corresponding to the heating unit 2 and the heating coil corresponding to the heating unit 3 are concealed under the target heating object 8, and these light-emitting parts 22, 24, 31, and 33 may be turned off by the light-emission control unit 11b.

The heating control unit 11a controls to supply a high-frequency current to the heating coil on the basis of the input from the user (S105). Then, when the user turns off the heating key (Yes at S106), the light-emission control unit 11b lights the light-emitting parts of the heating coil for finishing heating in white (S107A). The heating control unit 11a stops supply of high-frequency current to the heating coil (S108). Thereafter, when the power key 7a is turned off by the user (Yes at S109), the light-emission control unit 11b turns off all the light-emitting parts (S110).

The induction cooking device of the preferred embodiment lights all the light-emitting parts in white when the power source is turned on, and when heating the target heating object, the light-emitting parts provided near the outer circumference of the heating coil to be operated is lighted in red, but when heating one target heating object by a plurality of heating coils, the light-emitting parts disposed between the plural heating coils is kept lighted in white, and only the light-emitting parts provided near the outer circumference of the combined heating coil is lighted in red. Therefore, before start of heating, the user easily recognizes where to place the target heating object. When heating the target heating object, if a plurality of heating units are combined and used, the outer circumference of the combined heating units is displayed, and the user can easily recognize where to put on the target heating object. If the user pushes another heating key by mistake, the heating unit for starting heating is precisely displayed on the top plate, and the user can notice the error easily.

In this preferred embodiment, the light-emission control unit 11b lights the light-emitting parts in white and red colors, but other colors may be used. Alternatively, the light-emitting parts may be illuminated in three or more colors.

In the preferred embodiment, the light-emitting parts are two monochromatic LEDs 13a and 13b of different colors, but one two-color LED may be used.

In the preferred embodiment, after the power key is turned off, at step S110, the light-emission control unit 11b turns off all the light-emitting parts. Instead, at step S111, in a specified time after the light-emission control unit 11b lights all the light-emitting parts in white, the light-emitting parts lighting in white may be turned off. In this case, before lapse of specified time, at step S107A in FIG. 11, the light-emission control unit 11b lights the light-emitting parts of the heating coil for finishing heating in white (according to the step). On the other hand, after lapse of specified time, at step S107A in FIG. 11, the light-emission control unit 11b turns off the light-emitting parts of the heating coil for finishing heating. That is, these light-emitting parts are not lighted in white. As a result, the power may be saved, and the aging deterioration of the LED can be suppressed, and the durability may be enhanced.

In this preferred embodiment, too, as the same as in modified example 1 of preferred embodiment 1, light-emitting parts 61 to 66 (FIG. 7) may be further provided. In this case, when turning on the power source, the light-emission control unit 11b lights the light-emitting parts 21-24, 31-34, 41-44, and 51-55 in white, and does not turn on the light-emitting parts 61-66 (step S111 in FIG. 11). When heating one target heating object by a plurality of heating coils, the light-emission control unit 11b turns on six light-emitting parts provided near the outer circumference of the combined heating coil for starting heating (including two light-emitting parts disposed between two heating coils used in heating out of the light-emitting parts 61 to 66) (step S104A in FIG. 11).

Figure 9:
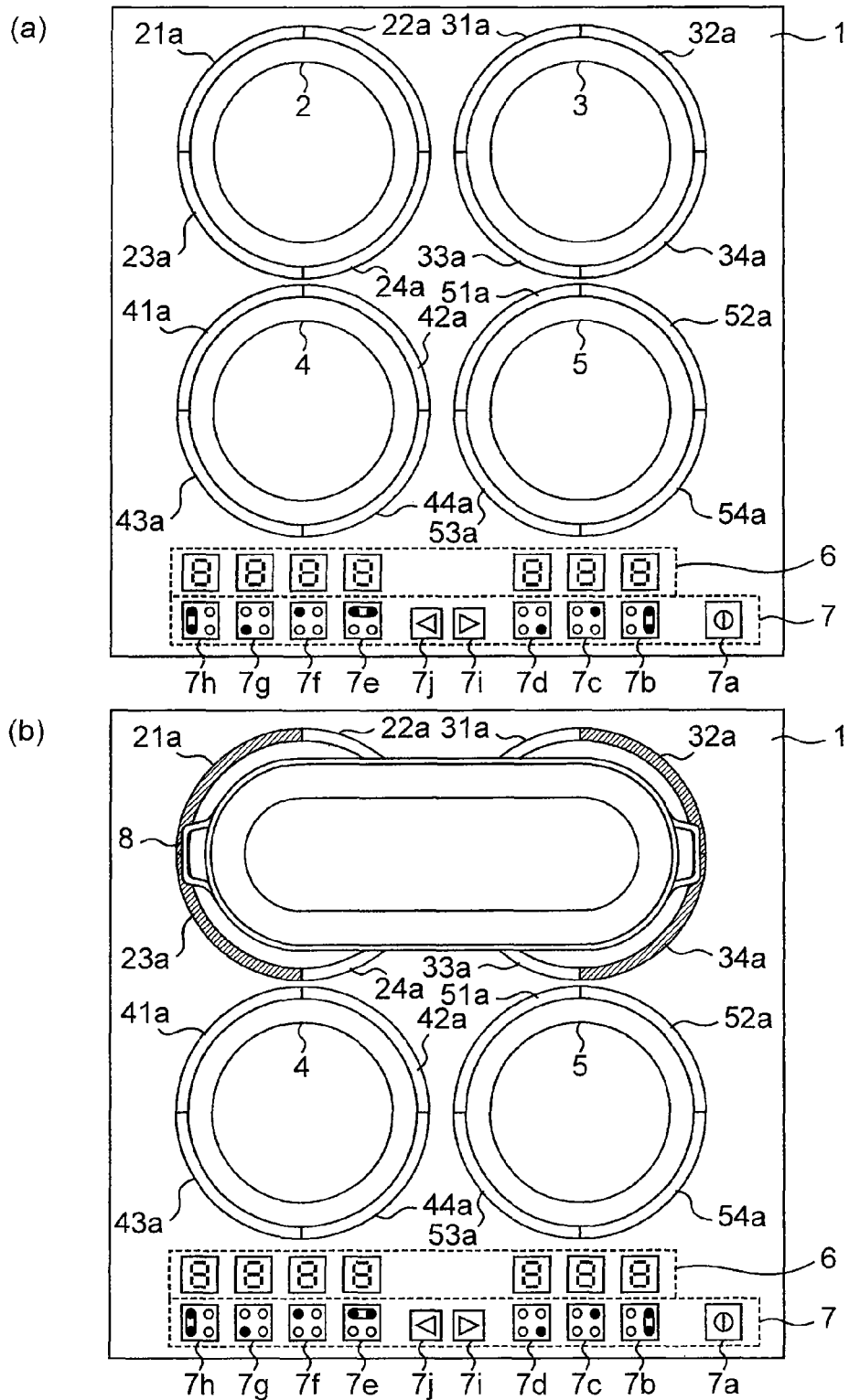
FIG. 9(*a*) is a top view of an induction cooking device in modified example 2 of preferred embodiment 1 of the invention, and FIG. 9(*b*) is a diagram of lighting example of the light-emitting parts when the heating key 7*e* is turned on in modified example 2 in preferred embodiment 1 of the invention.

Also in this preferred embodiment, as the same as in modified example 2 of preferred embodiment 1, the length of one light-emitting part may be set at ¼ of the circumference (see FIG. 9).

Preferred Embodiment 3

Configuration of Induction Cooking Device

This preferred embodiment relates to an induction cooking device for warning by blinking the light-emitting parts provided near the outer circumference of the combined heating coils, if the target heating object is not placed on the corresponding heating unit, although it is commanded to heat one target heating object by a plurality of heating coils, thereby not starting heating by these heating coils.

Figure 12:
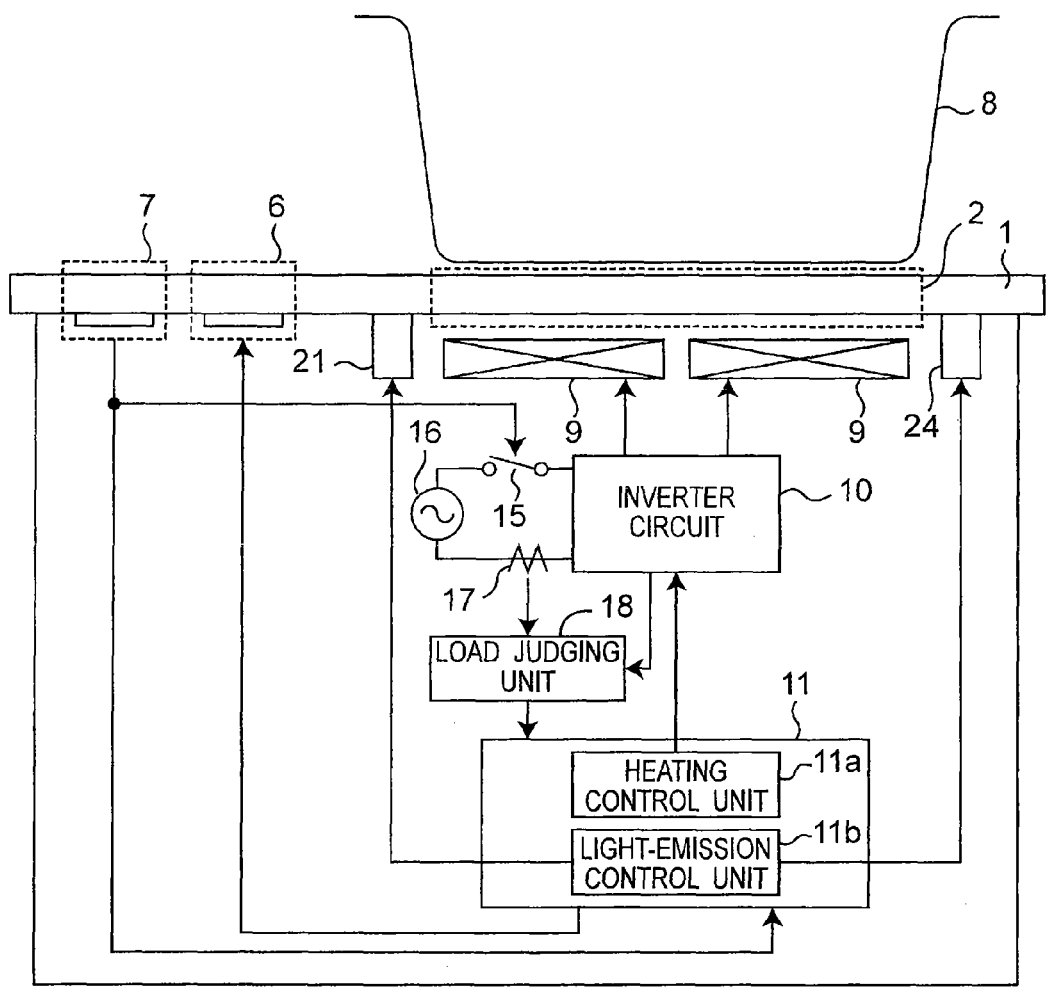
FIG. 12 is a configuration diagram of an induction cooking device in preferred embodiment 3 of the invention.

The configuration of the induction cooking device of this preferred embodiment is the same as in preferred embodiment 1 shown in FIG. 1 and FIG. 3, and the explanation is omitted. FIG. 12 shows a configuration of the induction cooking device in preferred embodiment 3. In FIG. 1, four heating units 2, 3, 4, and 5 are shown, but in FIG. 12, only one heating unit 2 is shown for the convenience of explanation. An inverter circuit 10 receives supply of an electric power from a power source 16 when a power switch 15 is turned on. The induction cooking device of this preferred embodiment includes an input current detector 17 for detecting the input current to the inverter circuit 10 and a load checking unit 18 for checking if the target heating object is placed or not on the basis of the input current detected by the input current detector 17 and the current flowing in the heating coil entered from the inverter circuit 10. The configuration of the induction cooking device of this preferred embodiment is the same as in preferred embodiment 1 except for the input current detector 17 and the load checking unit 18, and the other explanations are omitted.

<Operation of Induction Cooking Device>

Figure 13:
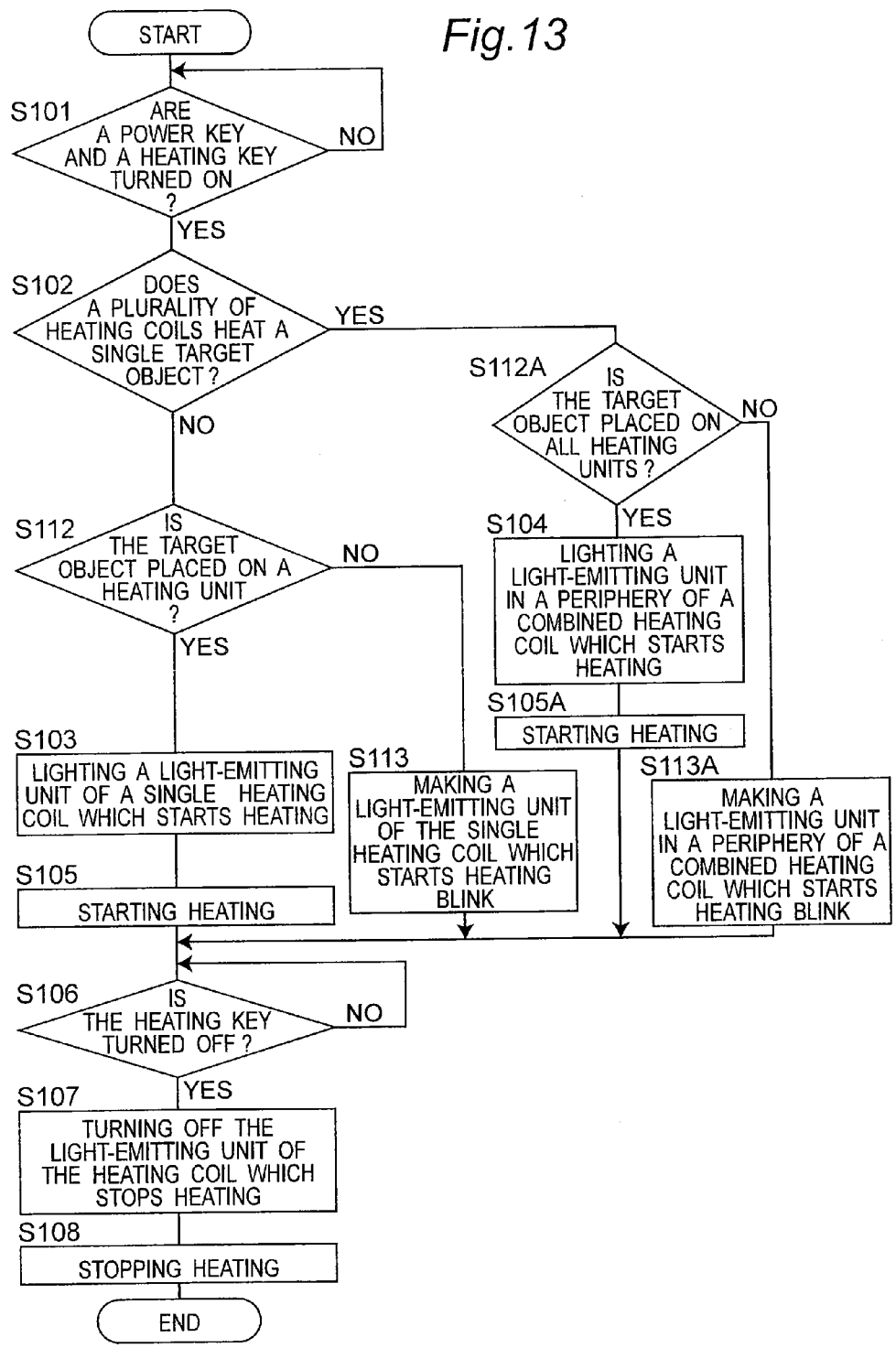
FIG. 13 is a flowchart of operation control of the light-emitting parts of the induction cooking device in preferred embodiment 3 of the invention.

FIG. 13 shows a flowchart of operation control of the light-emitting parts of the induction cooking device in preferred embodiment 3 of the invention. When the power key 7a is in off state, the light-emission control unit 11b turns off all the light-emitting parts. When the user turns on the power key 7a (Yes at S101A), the light-emission control unit 11b judges whether to heat one target heating object by a plurality of heating coils or not on the basis of the input from the user (S102). More specifically, when any one of the heating keys 7b, 7e, and 7h (FIG. 1) is turned on, the light-emission control unit 11b judges to heat one target heating object by a plurality of heating coils, and when any one of the heating keys 7c, 7d, 7f, and 7g (FIG. 1) is turned on, it judges to heat one target heating object by one heating coil.

When the light-emission control unit 11b judges to heat one target heating object by one heating coil (No at S102), the load checking unit 18 checks if the target heating object 8 is placed on the heating unit for starting heating or not (S112). More specifically, if the input current flowing into the inverter circuit 10 is not less than the value corresponding to the current flowing in the heating coil, the load checking unit 18 checks that the target heating object 8 is placed on the heating unit for starting heating, and if the input current flowing into the inverter circuit 10 is less than the value corresponding to the current flowing in the heating coil, the load checking unit 18 checks that the target heating object 8 is not placed on the heating unit for starting heating. Meanwhile, it is not necessary to measure the input current and the heating coil current directly, and instead of the heating coil current, for example, the voltage of the heating coil, or the voltage of a constituent component of the inverter circuit 10 such as switching element may be measured. That is, the input current and the heating coil current may be measured indirectly.

When the load checking unit 18 checks that the target heating object 8 is placed on the heating unit for starting heating (Yes at S112), the light-emission control unit 11b turns on the four light-emitting parts provided near the outer circumference of one heating coil for starting heating (S103). Next, on the basis of the input from the user, the heating control unit 11a controls the inverter circuit 10 for supplying a high-frequency current to the heating coil specified by a command for starting heating (S105). On the other hand, when the load checking unit 18 checks that the target heating object 8 is not placed on the heating unit for starting heating (No at S112), the light-emission control unit 11b blinks the four light-emitting parts provided near the outer circumference of one heating coil for starting heating (S113), and displays warning. The heating control unit 11a controls the inverter circuit 10 not to supply current to the heating coil specified by a command for starting heating.

On the other hand, if the light-emission control unit 11b judges to heat one target heating object by a plurality of heating coils (Yes at S102), the load checking unit 18 checks whether the target heating object 8 is placed on all of the plurality of heating units for starting heating or not (S112A). When the load checking unit 18 checks that the target heating object 8 is placed on all of the plurality of heating units for starting heating (Yes at S112A), the light-emission control unit 11b turns on the four light-emitting parts provided near the outer circumference of the combined heating coil for starting heating (S104). Next, on the basis of the input from the user, the heating control unit 11a controls the inverter circuit 10 to supply a high-frequency current to a plurality of heating coils specified by a command for starting heating (S105A). On the other hand, when the load checking unit 18 checks that the target heating object 8 is not placed on any one of the plurality of heating units for starting heating (No at S112A), the light-emission control unit 11b blinks the four light-emitting parts provided near the outer circumference of the combined heating coil for starting heating (S113A), and displays warning. The heating control unit 11a controls the inverter circuit 10 not to supply current to the plurality of heating coils receiving a command for starting heating. The following steps S106 to S108 are the same as in preferred embodiment 1, and the explanation is omitted.

The induction heating device of the preferred embodiment does not start heating coils with warning by blinking the light-emitting parts provided near the outer circumference of the combined heating coils, in spite of the input instructing to heat one target heating object by a plurality of heating coils, if the target heating object is not placed on the corresponding heating units. As a result, if the user put the target heating object on another position by mistake, since the outer circumference of the combined heating unit is displayed on the top plate, the user easily recognizes the mistake. Of if the user turns on another heating key by mistake, since the outer circumference of the combined heating unit is displayed on the top plate, the user easily recognizes the mistake. Above all, it is safe because current is not supplied to the heating coil on which the target heating object is not placed.

Modified Example 3

Figure 14:
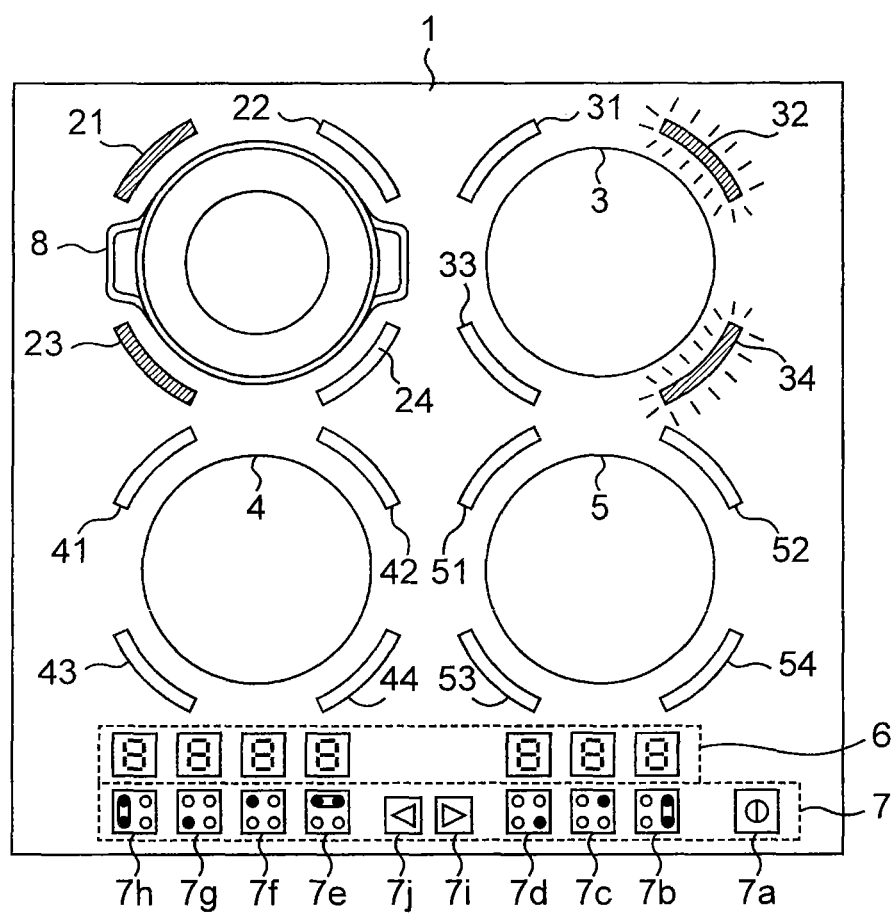
FIG. 14 is a diagram of lighting example of the light-emitting parts when the heating key 7*e* is turned on in modified example 3 in preferred embodiment 3 of the invention but the target heating object is put on a heating unit 2 only.

In this preferred embodiment, as in FIG. 13, when the load checking unit 18 checks that the target heating object 8 is not placed on any one of the plurality of heating units for starting heating (No at S112A), the light-emission control unit 11b blinks the four light-emitting parts provided near the outer circumference of the combined heating coil for starting heating (S113A), and displays warning in the portion coupling the plurality of heating coils, and heating of the plurality of heating coils specified by a command for starting heating is not started. Instead, if the load checking unit 18 checks that the target heating object 8 is not placed on any one of the plurality of heating units for starting heating (No at S112A), the light-emission control unit 11b turns on only the light-emitting parts at the side on which the target heating object 8 is placed out of the four light-emitting parts provided near the outer circumference of the combined heating coil for starting heating, and blinks the light-emitting parts at the side on which the target heating object 8 is not placed, and the heating control unit 11a may start heating only the heating coil on which the target heating object 8 is placed. A specific example is shown in FIG. 14. FIG. 14 shows a lighting example of the light-emitting parts when the heating key 7e is turned on in modified example 3, but the target heating object 8 is placed only on the heating unit 2. The light-emission control unit 11b turns on the light-emitting parts 21 and 23 at the side on which the target heating object 8 is placed, and blinks the light-emitting parts 32 and 34 at the side on which the target heating object 8 is not placed. The heating control unit 11a starts heating by the heating coil corresponding to the heating unit 2 on which the target heating object 8 is placed, and does not start heating by the heating coil corresponding to the heating unit 3 on which the target heating object 8 is not placed.

Hence, if the user has placed the target heating object on a wrong position by mistake, warning is displayed on the top plate only on the side on which the target heating object is not placed out of the combined heating units, and the user easily recognizes the mistake. If the user turns on another heating key by mistake, since the top plate displays warning only at the side of the heating unit on which the target heating object is not placed, out of the heating units specified by a command for starting heating, the user easily recognizes the mistake. Above all, it is safe because current is not supplied to the heating coil on which the target heating object is not placed, and current is supplied to the heating coil on which the target heating object is placed, so that the user can start cooking without correcting the placing position.

As explained in modified example 3, in the case of operation for using the heating unit 2 and the heating unit 3 in combination, the heating control unit 11a starts heating in the heating coil corresponding to the heating unit 2 on which the target heating object 8 is placed, and does not start heating in the heating coil corresponding to the heating unit 2 on which the target heating object 8 is not placed, but it may be controlled not to start heating in either the heating unit 2 or the heating unit 3. In such a case, although the user operates intending to heat by using one heating unit, it is possible that the device operates differently contrary to the intention, probably due to wrong operation. Therefore, the safety may be enhanced more by stopping heating of both the heating unit 2 and the heating unit 3. In addition, the user notices lighting of the light-emitting parts 21 and 23 at the side on which the target heating object 8 is placed and blinking of the light-emitting parts 32 and 34 at the side on which the target heating object 8 is not placed, and can recognize which side or what is wrong.

In this preferred embodiment, too, as the same as in modified example 1 of preferred embodiment 1, light-emitting parts 61 to 66 (FIG. 7) may be further provided. In this case, when it is designed to heat one target heating object by a plurality of heating coils and when the target heating object is placed on all of the plural heating units for starting heating, the light-emission control unit 11b turns on six light-emitting parts provided near the outer circumference of the combined heating coil for starting heating (including two light-emitting parts disposed between two heating coils used in heating out of the light-emitting parts 61 to 66) (step S104 in FIG. 13). Although it is designed to heat one target heating object by a plurality of heating coils, when the target heating object 8 is not placed on any one of the plural heating units for starting heating, the light-emission control unit 11b blinks six light-emitting parts provided near the outer circumference of the combined heating coil for starting heating (including two light-emitting parts disposed between two heating coils used in heating out of the light-emitting parts 61 to 66) (step S113A in FIG. 13).

Also in this preferred embodiment, as in the modified example 2 of preferred embodiment 1, the length of one light-emitting part may be set at ¼ of the circumference (see FIG. 9).

In this preferred embodiment, as in the preferred embodiment 2, the light-emitting parts may be lighted in two colors.

For example, supposing to heat a large target heating object such as an iron plate, a heating key for instructing heating in combination of four adjacent heating units 2, 3, 4, and 5 may be additionally provided, together with a necessary display unit for recognizing its state of operation, and depending on the operation of the heating key, the four adjacent heating units 2, 3, 4, and 5 may be heated in combination. In this case, by lighting up the light-emitting parts 21, 32, 43, and 54 in FIG. 1, the user correctly recognizes that the four corners of the four heating units 2, 3, 4, and 5 are illuminated and are combined to be used in heating. The number of coils to be combined or the method of combination is not particularly specified. The number of light-emitting parts or the method of combination of lighting is not particularly specified either.

Preferred Embodiment 4

Configuration of Induction Cooking Device

Figure 15:
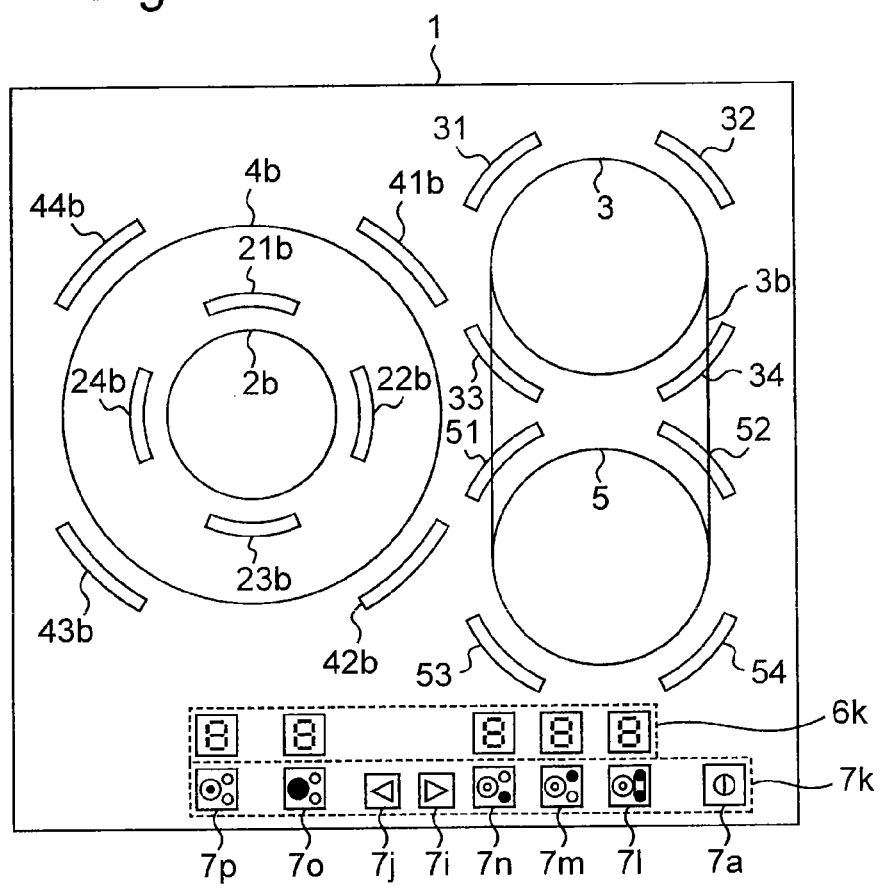
FIG. 15 is a top view of an induction cooking device in preferred embodiment 4 of the invention.

FIG. 15 is a top view of an induction cooking device in preferred embodiment 4 of the invention. The upper part of the induction cooking device of the preferred embodiment is provided with a top plate 1 of crystallized ceramic for transmitting light, and the upper side of the top plate 1 is provided with a first heating unit 2b, a second heating unit 3, a third heating unit 4b, a fourth heating unit 5, and a fifth heating unit 3b, on which the target heating object is placed and heated. The first heating unit 2b is a heating unit for a target heating object small in pan bottom diameter, and the third heating unit 4b is a heating unit for a target heating object large in pan bottom diameter. The region of each heating unit is printed and indicated on the upper side or the lower side of the top plate 1.

Although not shown in FIG. 15, beneath the top plate 1, heating coils are provided at positions corresponding to the first to fourth heating units 2b, 3, 4b, and 5. The heating coil corresponding to the third heating unit 4b is provided on the outer circumference of the heating coil corresponding to the first heating unit 2b. When heating the third heating unit 4b, the heating coil corresponding to the first heating unit 2b, and the heating coil corresponding to the third heating unit 4b are operated cooperatively. When heating the fifth heating unit 3b, the heating coil corresponding to the second heating unit 3 and the heating coil corresponding to the fourth heating unit 5 are operated cooperatively. The fifth heating unit 3b is a region heated inductively when the heating coil corresponding to the second heating unit 3 and the heating coil corresponding to the fourth heating unit 5 are operated cooperatively. The fifth heating unit 3b includes the second heating unit 3 and the fourth heating pat 5.

At the front side of the top plate 1 (at the user's side), a display unit 6k and an operation unit 7k are provided. The operation unit 7k includes a power key 7a for turning on and off the power source, heating keys 7l, 7m, 7n, 7o, and 7p for turning on and off the heating operation, and heat level adjustment keys 7i and 7j. The heating key 7l is a key for operating the heating coil corresponding to the second heating unit 3 and the heating coil corresponding to the fourth heating unit 5 cooperatively. The heating key 7m is a key for operating the heating coil corresponding to the second heating unit 3. The heating key 7n is a key for operating the heating coil corresponding to the fourth heating unit 5. The heating key 7o is a key for operating the heating coil corresponding to the first heating unit 2b and the heating coil corresponding to the third heating unit 4b cooperatively. The heating key 7p is a key for operating the heating coil corresponding to the first heating unit 2b. The display unit 6k includes five heat level display parts corresponding respectively to the five heating keys 7l to 7p. The heat level display parts indicate the heat level of the heating units printed on the corresponding heating keys in numerical figures.

Near the outer circumference of the first heating unit 2b, first light-emitting parts 21b to 24b are provided. Near the outer circumference of the second heating unit 3, second light-emitting parts 31 to 34 are provided. Near the outer circumference of the third heating unit 4b, third light-emitting parts 41b to 44b are provided. Near the outer circumference of the fourth heating unit 5, fourth light-emitting parts 51 to 54 are provided. In this manner, one heating unit is individually provided with four light-emitting parts.

The first light-emitting parts 21b to 24b illuminate the outer circumferential region of the first heating unit 2b. Hence, the user can easily recognize the region of placing the target heating object on the first heating unit 2b. The second light-emitting parts 31 to 34 illuminate the outer circumferential region of the second heating unit 3. Hence, the user can easily recognize the region of placing the target heating object on the second heating unit 3. The third light-emitting parts 41b to 44b illuminate the outer circumferential region of the third heating unit 4b. Hence, the user can easily recognize the region of placing the target heating object on the third heating unit 4b. The fourth light-emitting parts 51 to 54 illuminate the outer circumferential region of the fourth heating unit 5. Hence, the user can easily recognize the region of placing the target heating object on the fourth heating unit 5. The second light-emitting parts 31 and 32 and the fourth light-emitting parts 53 and 54 illuminate the outer circumferential region of the fifth heating unit 3b. Hence, the user can easily recognize the region of placing the target heating object on the fifth heating unit 3b.

Figure 16:
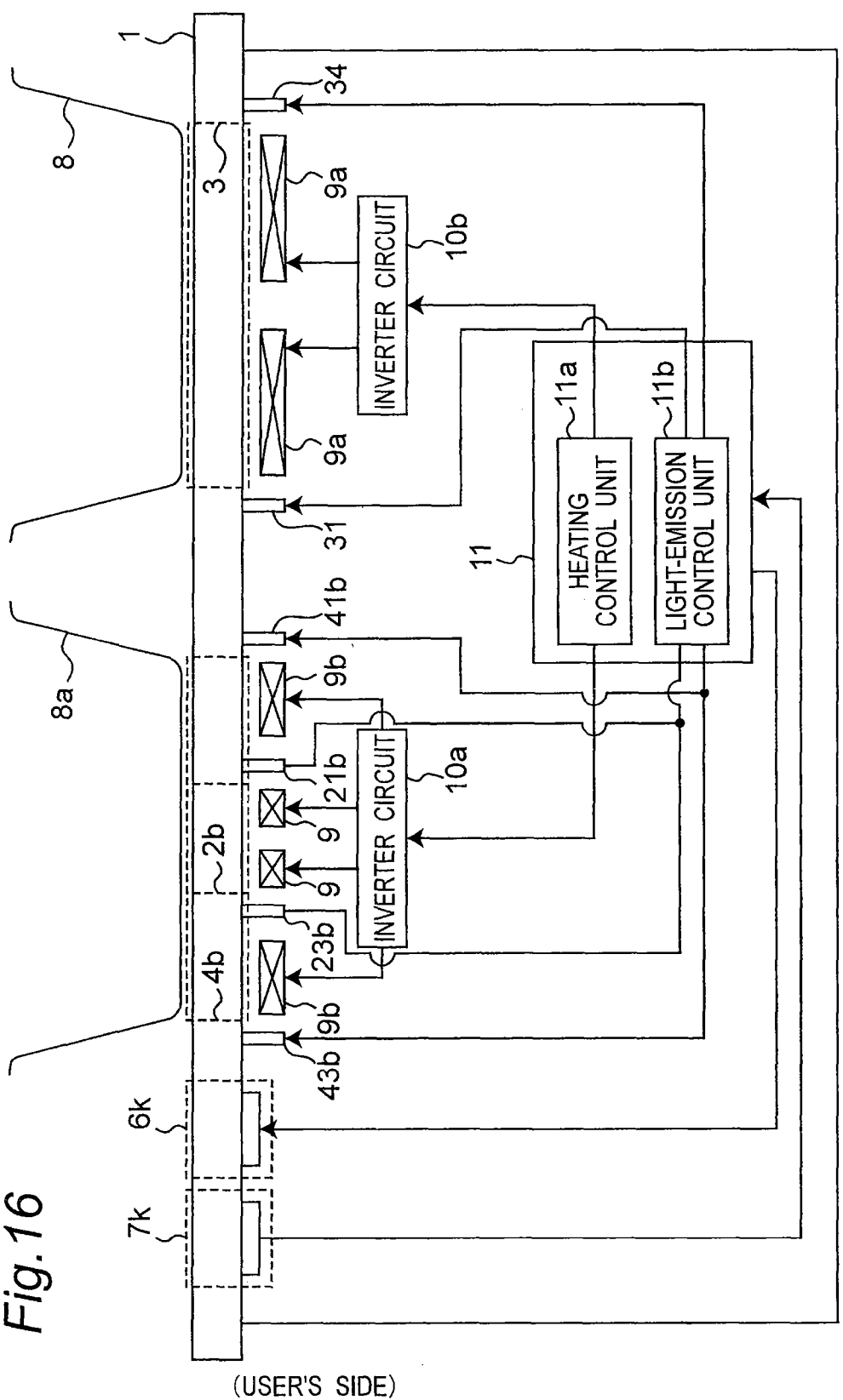
FIG. 16 is a configuration diagram of the induction cooking device in preferred embodiment 4 of the invention.

FIG. 16 shows a configuration of the induction cooking device in the preferred embodiment of the invention. As compared with FIG. 15 in which five heating units 2b, 3, 3b, 4b, and 5 are shown, FIG. 16 shows three heating units 2b, 3, and 4b for the sake of convenience of explanation. The induction cooking device of the preferred embodiment includes the top plate 1, the display unit 6k and the operation unit 7k provided on the top plate 1. Beneath the top plate 1, a first heating coil 9 is disposed at a position corresponding to the first heating unit 2b, a second heating coil 9a is disposed at a position corresponding to the second heating unit 3, and a third heating coil 9b is disposed at a position corresponding to the third heating unit 4b. The first heating coil 9 and the third heating coil 9b are disposed concentrically, but the second heating coil 9a and the other heating coils 9a and 9b are not disposed concentrically. The first to third heating coils 9, 9a and 9b generate an inductive magnetic field, and heat the objects of heating 8 and 8a placed on the top plate 1.

Further, the induction cooking device of the preferred embodiment includes a first inverter circuit 10a for supplying a high-frequency current to the first and third heating coils 9 and 9b provided beneath the first and third heating coils 9 and 9b, and a second inverter circuit 10b for supplying a high-frequency current to the second heating coil 9a provided beneath the second heating coil 9a. The vicinity of the outer circumference of the first heating coil 9 is provided with the first light-emitting parts 21b, 23b (the light-emitting parts 22b, 24b not shown), the vicinity of the outer circumference of the third heating coil 9b is provided with the third light-emitting parts 41b and 43b (the light-emitting parts 42b and 44b not shown), and the vicinity of the outer circumference of the second heating coil 9a is provided with the second light-emitting parts 31 and 34 (the light-emitting parts 32 and 33 not shown). Moreover, the induction cooking device of the preferred embodiment includes a control unit 11 for controlling the entire induction cooking device. The control unit 11 includes a heating control unit 11a for issuing a control signal to the inverter circuits 10a and 10b for controlling the high-frequency current to be supplied to the heating coils 9, 9a, and 9b on the basis of the input from the operation unit 7k, and a light-emission control unit 11b for illuminating the light-emitting parts 21b to 24b, 31 to 34, and 41b to 44b on the basis of the input from the operation unit 7k.

The configuration of the light-emitting part 21b is as the same as the configuration of the light-emitting part 21 of preferred embodiment 1 shown in FIG. 3.

<Operation of Induction Cooking Device>

The induction cooking device of the preferred embodiment includes a heating unit heated by one heating coil and a heating unit heated by two heating coils, and after the power source is turned on, the parts of the vicinity of the outer circumference of the plurality of heating units are illuminated sequentially. When a command for starting heating is entered, the vicinity of the outer circumference of the corresponding heating unit is illuminated.

Figure 17:
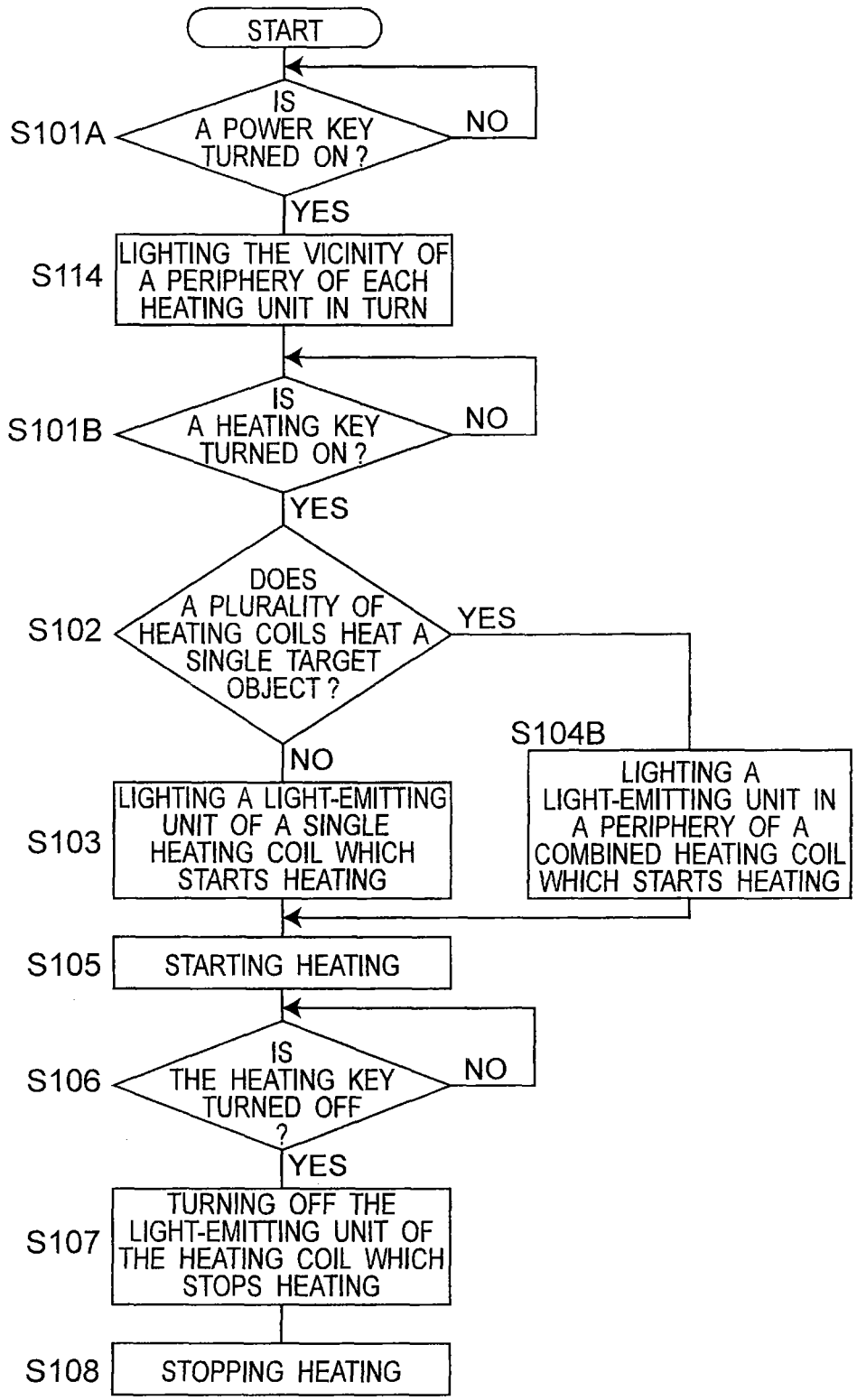
FIG. 17 is a flowchart of operation control of the light-emitting parts of the induction cooking device in preferred embodiment 4 of the invention.

FIG. 17 shows a flowchart of operation control of the light-emitting parts of the induction cooking device in preferred embodiment 4 of the invention. When the power key 7a is in off state, the light-emission control unit 11b turns off all the light-emitting parts. When the user turns on the power key 7a (Yes at S101A), the operation is set in a heating area sequential display mode for illuminating the vicinity of the outer circumference of the heating units 2b, 3, 3b, 4b, and 5 sequentially (S114).

Figure 18:
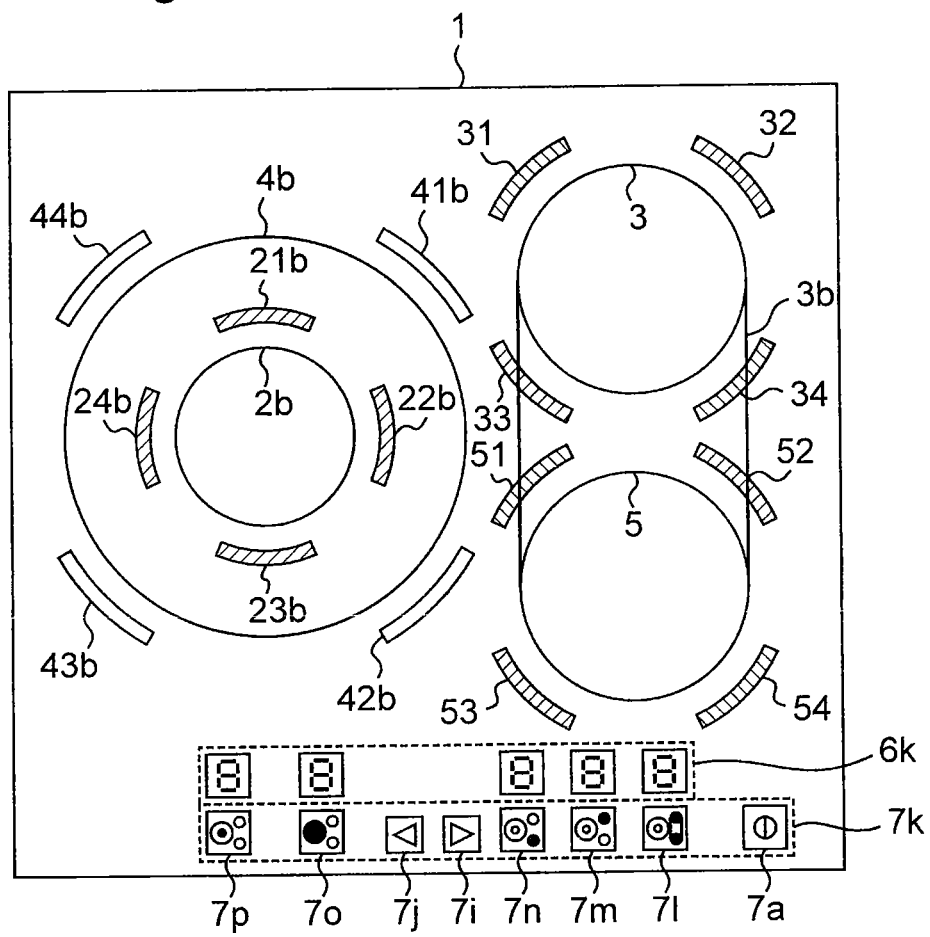
FIG. 18 is a diagram of lighting example of the light-emitting parts when lighting a plurality of heating units 2*b*, 3, 3*b*, 4*b*, and 5 sequentially in preferred embodiment 4 of the invention.
Figure 19:
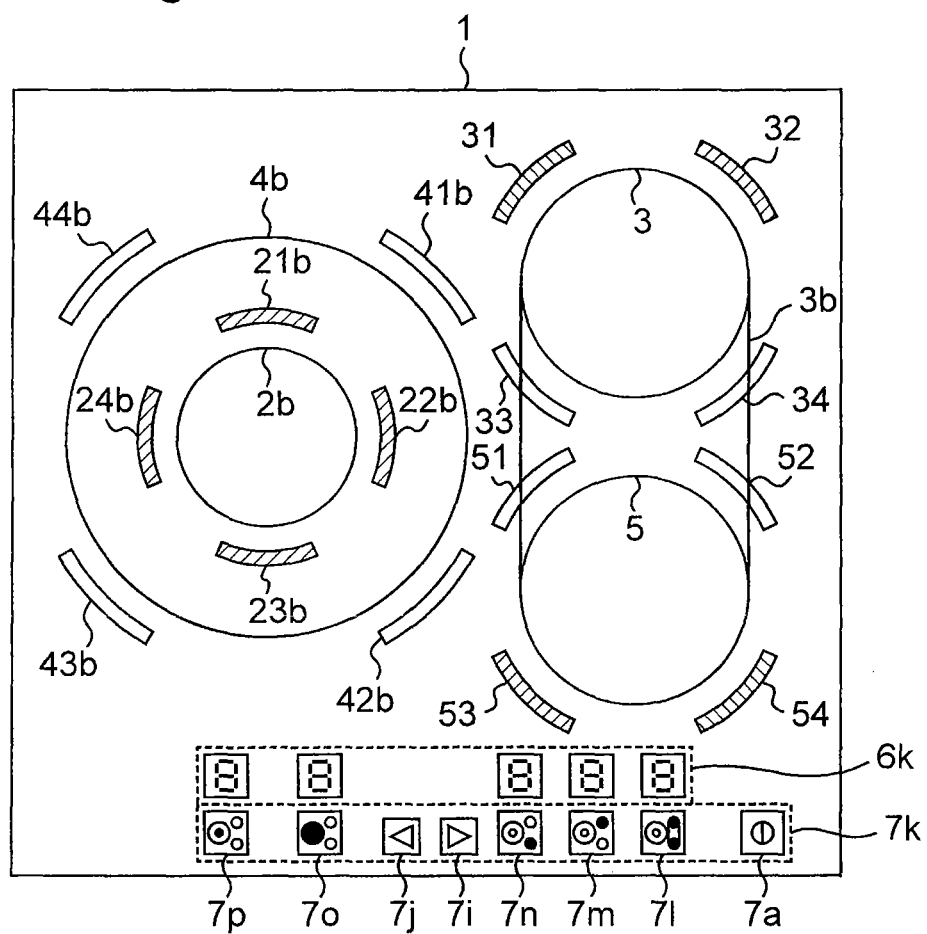
FIG. 19 is a diagram of lighting example of the light-emitting parts when lighting a plurality of heating units 2*b*, 3, 3*b*, 4*b*, and 5 sequentially in preferred embodiment 4 of the invention.
Figure 20:
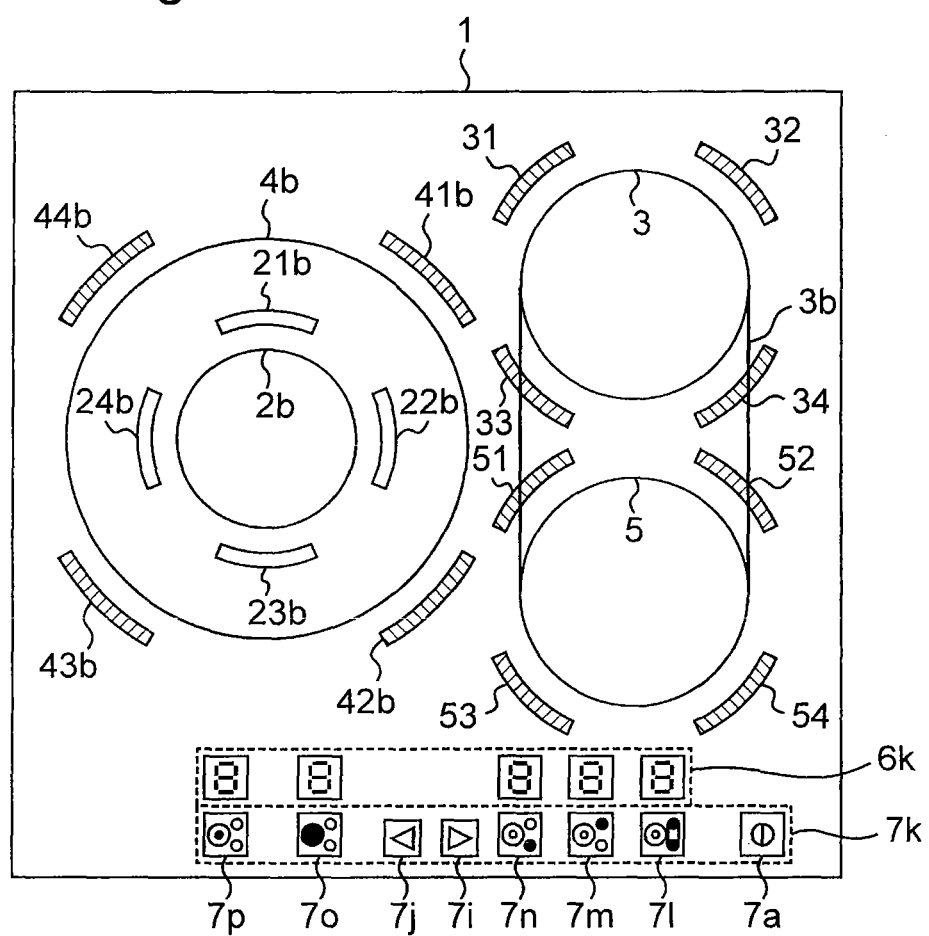
FIG. 20 is a diagram of lighting example of the light-emitting parts when lighting a plurality of heating units 2*b*, 3, 3*b*, 4*b*, and 5 sequentially in preferred embodiment 4 of the invention.

For example, the illumination as shown in FIG. 18 (first light-emitting example) is followed by the illumination as shown in FIG. 19 (second light-emitting example), and is finally followed by illumination as shown in FIG. 20 (third light-emitting example). In FIG. 18 to FIG. 20, the illuminated portions are indicated by shaded areas. The first light-emitting example (FIG. 18) is an example of heating and illuminating by putting one target heating object each on the first heating unit 2b, the second heating unit 3, and the fourth heating unit 5. The light-emission control unit 11b turns on the first light-emitting parts 21b to 24b near the outer circumference of the first heating unit 2b, the second light-emitting parts 31 to 34 near the outer circumference of the second heating unit 3, and the fourth light-emitting parts 51 to 54 near the outer circumference of the fourth heating unit 5. The second light-emitting example (FIG. 19) is an example of heating and illuminating by putting one target heating object each on the first heating unit 2b and the fifth heating unit 3b. The light-emission control unit 11b turns on the first light-emitting parts 21b to 24b near the outer circumference of the first heating unit 2b and the fifth light-emitting parts 53 and 54. The light-emission control unit 11b does not light the second light-emitting parts 33 and 34 and the fourth light-emitting parts 51 and 52. The third light-emitting example (FIG. 20) is an example of heating and illuminating by putting one target heating object each on the second heating unit 3, the third heating unit 4b, and the fourth heating unit 5. The light-emission control unit 11b turns on the second light-emitting parts 31 to 34 near the outer circumference of the second heating unit 3, the third light-emitting parts 41b to 44b near the outer circumference of the third heating unit 4b, and the fourth light-emitting parts 51 to 54 near the outer circumference of the fourth heating unit 5. The light-emission control unit 11b does not turn on the first light-emitting parts 21b to 24b.

When the user turns on any one of the heating keys 7l to 7p (Yes at S101B), the heating mode is started, and on the basis of the input from the user, it is judged whether to heat one target heating object by a plurality of heating coils or not (S102). Herein, the heating keys 7l and 7o (FIG. 15) are keys for heating by operating two heating coils cooperatively, and the heating keys 7m, 7n, and 7p (FIG. 15) are keys for heating by operating one heating coil. Hence, when either one of the heating keys 7l and 7o (FIG. 15) is turned on, the light-emission control unit 11b judges to heat one target heating object by a plurality of heating coils, and when either one of the heating keys 7m, 7n, and 7p (FIG. 15) is turned on, the light-emission control unit 11b judges to heat one target heating object by one heating coil. When the light-emission control unit 11b judges to heat one target heating object by one heating coil (No at S102), the light-emission control unit 11b turns on the four light-emitting parts provided near the outer circumference of one heating coil for starting heating (S103).

Figure 21:
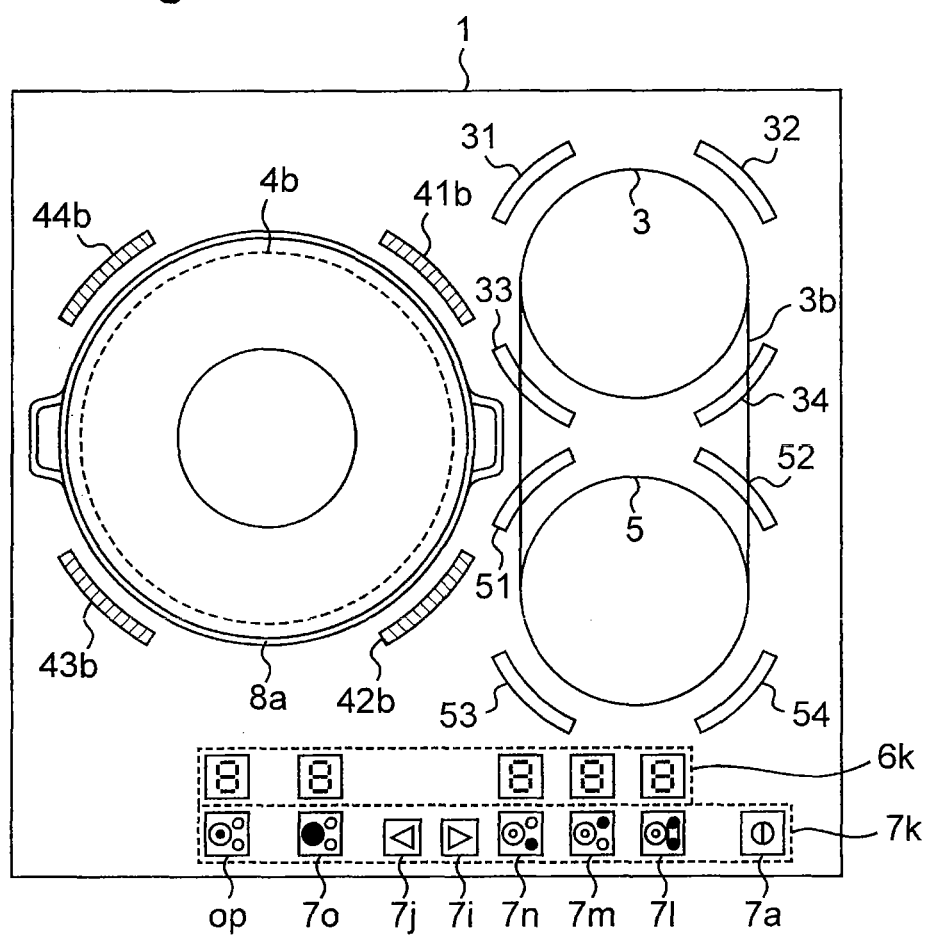
FIG. 21 is a diagram of lighting example of the light-emitting parts when the heating key 7*o* is turned on in preferred embodiment 4 of the invention.
Figure 22:
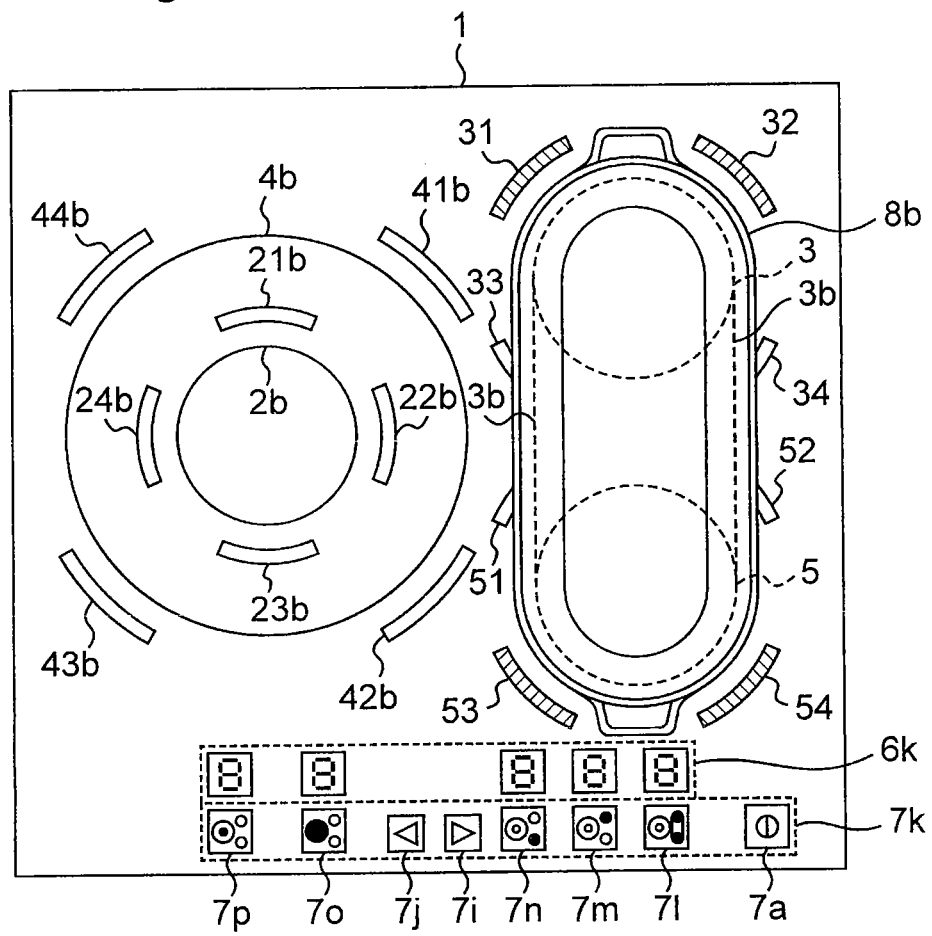
FIG. 22 is a diagram of lighting example of the light-emitting parts when the heating key 7*l* is turned on in preferred embodiment 4 of the invention.

On the other hand, when the light-emission control unit 11b judges to heat one target heating object by a plurality of heating coils (Yes at S102), the light-emission control unit 11b turns on the four light-emitting parts provided near the outer circumference of the heating coils for starting heating cooperatively (S104B). Specific examples are shown in FIG. 21 and FIG. 22. In FIG. 21 and FIG. 22, the illuminated portions are indicated by shaded areas.

FIG. 21 shows a lighting example of the light-emitting parts when the heating key 7o is turned on for heating one target heating object 8a placed on the third heating unit 4b. The coils to be operated cooperatively when the heating key 7o is turned on are the first heating coil 9 and the third heating coil 9b. Therefore, the light-emission control unit 11b turns on the third light-emitting parts 41b to 44b near the outer circumference of the heating coils for starting heating cooperatively, but does not turn on the first light-emitting parts 21b to 24b. As a result, the vicinity of the outer circumference of the third heating unit 4b is illuminated. FIG. 22 shows a lighting example of the light-emitting parts when the heating key 7l is turned on for heating one target heating object 8b placed on the fifth heating unit 3b. The coils to be operated cooperatively when the heating key 7l is turned on are the heating coil corresponding to the second heating unit 3 and the heating coil corresponding to the fourth heating unit 5. Therefore, the light-emission control unit 11b turns on the second light-emitting parts 31 and 32 and the fourth light-emitting parts 53 and 54 near the outer circumference of the heating coils for starting heating cooperatively. The light-emission control unit 11b does not light the second light-emitting parts 33 and 34 and the fourth light-emitting parts 51 and 52, which are disposed between the heating coil corresponding to the second heating unit 3 and the heating coil corresponding to the fourth heating unit 5. As a result, the vicinity of the outer circumference of the fifth heating unit 3b is illuminated.

The heating control unit 11a controls to supply a high-frequency current to the heating coils depending on the input from the user (S105). For example, when the heating key 7o is turned on, the heating control unit 11a supplies a high-frequency current to the first heating coil 9 and the third heating coil 9b. When the heating key 7l is turned on, the heating control unit 11a supplies a high-frequency current to the heating coil corresponding to the second heating unit 3 and the heating coil corresponding to the fourth heating unit 5 (Yes at S106), and the light-emission control unit 11b turns off the light-emitting parts of the heating coils for finishing heating (S107). The heating control unit 11a stops supply of high-frequency current to the heating coils (S108). Thereafter, the operation stops until the heating key 7l is turned on (S101B). Although the explanation is omitted, the on/off state of the power key 7a is always monitored, and when the power key 7a is turned off, immediately the power-off mode is set, heating operation is finished and all of the illuminating displays are turned off, thereby the operation stops until the power switch is turned on (S101A).

The induction cooking device of the preferred embodiment has a function of heating one target heating object by operating two heating coils cooperatively, and after turning on the power source, as shown in FIGS. 18 to 20, the vicinity of the outer circumference of each heating unit is illuminated sequentially. As a result, the user can recognize the type of the heating units (sizes and positions) before heating. Therefore, the user can recognize easily the region where to put on the pan.

Additionally, the induction cooking device of the preferred embodiment illuminates the vicinity of the outer circumference of the corresponding heating unit when a heating command is entered. As a result, even in the case of heating one target heating object by two or more heating coils, the vicinity of the outer circumference of the heating units operating cooperatively is illuminated, and the user can easily recognize where to put on the target heating object. If the user turns on another heating key by mistake, the heating unit for starting heating is correctly displayed on the top plate, and the user easily notices the mistake.

Modified Example 4

Figure 23:
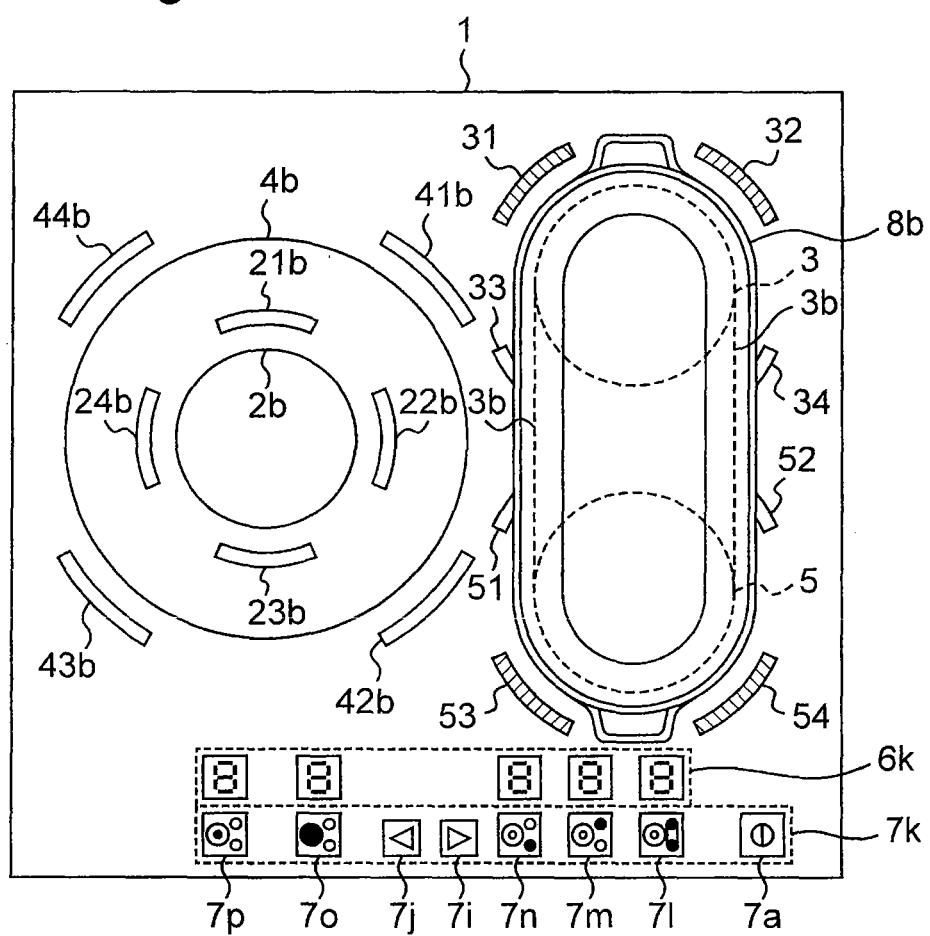
FIG. 23 is a top view of an induction cooking device in modified example 1 of preferred embodiment 4 of the invention.

The operation unit 7k of the induction cooking device of the preferred embodiment may be additionally provided with a demo key 7q as shown in FIG. 23. In this case, when the demo key 7q is continuously pressed for a long while (for example, 10 seconds) before the user turns on any one of the heating keys 7l to 7p (S101B in FIG. 17), at step S105 in FIG. 17, the heating control unit 11a is set in demo mode for controlling so as not to supply high-frequency current to the heating coils. Once the demo mode is set, the mode is maintained by the data stored in the storage element even if the power source is turned off or if the power source is turned on again. As a result, high-frequency current does not flow into the heating coil, and it is safe, for example when making a demonstration at a shop counter or the like, even if the power switch is once turned off, and turned on again, and the heating key 7o is operated. In addition, a demo mode display unit (not shown) may be provided to display the demo mode when the demo key 7q is pressed to be in the demo mode. Further, as demo mode transfer operation unit for transferring to the demo mode, instead of the demo key 7q, another key may be provided at a concealed position. Or, as a demo mode transfer operation unit, specific keys may be combined out of the keys 7a and 7l to 7p, and by specified operation of them (for example, simultaneous pressing of three keys), to transfer the ordinary heating mode to the demo mode, or the demo mode to the ordinary heating mode.

Modified Example 5

In the preferred embodiment, the light-emitting part has a one single-color LED as shown in FIG. 3, but may be composed of two or more single-color LEDs as shown in FIG. 10, or one two-color LED. When lighting in two colors, at step S114 in FIG. 17, the light-emission control unit 11b lights the light-emitting parts in a first color, and at steps S103 and S104B in FIG. 17, the light-emission control unit 11b lights the light-emitting parts in a second color.

In the preferred embodiment, at step S114 in FIG. 17, the plurality of heating units 2b, 3, 3b, 4, and 5 are illuminated sequentially as shown in FIG. 18 to FIG. 20, but the sequence is not specified. For example, in the sequence of the heating keys 7l to 7p, the plurality of the heating units 2b, 3, 3b, 4b, and 5 may be illuminated one by one. Or, the light emission may be repeated until the heating key is turned on.

In the preferred embodiment, the light-emission control unit 11b lights the light-emitting parts, but it may also blink.

In the preferred embodiment, the plurality of light-emitting parts are divided into four sections, and an interval to the other light-emitting parts is provided around one heating coil, and the parts are disposed so that the light may scatter uniformly, but the number of divisions may be changed, and the adjacent light-emitting parts may be disposed closely to each other, so that the adjacent light-emitting parts look illuminating continuously (see FIG. 9).

INDUSTRIAL APPLICABILITY

The induction cooking device of the invention shows the user where to put on the target heating object even in the case of heating one target heating object by a plurality of heating coils, and is very useful as the induction cooking device used in a general household.

The invention claimed is:

1. An induction cooking device comprising:
a top plate formed of a light permeable material;
a plurality of heating coils disposed beneath the top plate being operable to generate an alternating-magnetic field and heat a target heating object placed on the top plate inductively;
an inverter circuit being operable to supply a high-frequency current to the heating coils;
a control unit being operable to control the inverter circuit;
an operation unit being operable to enter and operate commands for heating control of the target heating object; and
a plurality of light-emitting parts provided near the outer circumference of the heating coils,
wherein the control unit has a heating control unit operable to control the output of the inverter circuit, and
a light-emission control unit is operable to control the light emission of the light-emitting parts, depending on the input from the operation unit, and
wherein the control unit is configured to set a heating mode which corresponds to a command inputted to the operation unit, the heating mode including a first heating mode and a second heating mode:
the first heating mode in which the heating control unit causes one heating coil among the plurality of heating coils to operate singularly for heating one target heating object and the light-emission control unit causes only the light-emitting parts provided near the outer circumference of the one heating coil which operates singularly, and
the second heating mode in which the heating control unit causes two or more adjacent heating coils having centers at different positions to operate cooperatively for heating one target heating object and the light-emission control unit causes the plurality of light-emitting parts to operate such that the light-emitting parts disposed between the adjacent heating coils are turned off and indicate the vicinity of the outer circumference of the two or more adjacent heating coil, and
wherein, when the operation unit receives a command for turning on a power of a main body, the control unit sets a heating area sequential display mode for turning on the light-emitting parts before the heating mode is set, and
wherein, during the heating area sequential display mode, the heating control unit stops operation of the plurality of heating coils and the light-emission control unit sequentially performs a first illumination mode and after or before the first illumination mode, a second illumination mode,
the first illumination mode indicating the vicinity of the outer circumference of the heating coil which singularly operates when the first heating mode is set, and
the second illumination mode indicating the vicinity of the outer circumference of the adjacent heating coils which cooperatively operate when the second heating mode is set with the light-emitting parts disposed between the adjacent heating coils turned off.

2. The induction cooking device according to claim 1, wherein: each one of the light-emitting parts includes a two-color light-emitting element;
the light-emission control unit lights all the light-emitting parts in a first color when the command for turning on the power of the main body is received from the operation unit;
the light-emission control unit lights the light-emitting parts provided near the outer circumference of the heating coil for starting heating in a second color when a command for starting heating of one target heating object by one heating coil is received from the operation unit;
the light-emission control unit turns off the light-emitting parts disposed between the heating coils for starting heating out of the light-emitting parts disposed near the outer circumference of each heating coil for starting heating when the command for heating one target heating object by the two or more adjacent heating coils having centers at different positions is entered from the operation unit, and lights the other light-emitting parts than the turned off light-emitting parts in the second color; and
the light-emission control unit turns off all the light-emitting parts when the command for turning off the power of the main body is received from the operation unit.

3. The induction cooking device according to claim 1, further comprising:
a load checking unit operable to check whether the target heating object is placed or not on each heating coil,
wherein if the load checking unit checks that the target heating object is not placed on any one of the two or more adjacent heating coils for starting heating when a command for heating one target heating object with the two or more adjacent heating coils having centers at different positions is entered from the operation unit, the light-emission control unit turns off the light-emitting parts disposed between the two or more adjacent heating coils for starting heating, and blinks the rest of the light-emitting parts, and the heating control unit controls the inverter circuit to supply no power to the two or more adjacent heating coils to which the command for starting heating is received.

4. The induction cooking device according to claim 1, further comprising:
a load checking unit operable to check whether the target heating object is placed on each heating coil or not,
wherein if the load checking unit checks that the target heating object is placed on one of the two or more adjacent heating coils when a command for heating one target heating object with the two or more adjacent heating coils having centers at different positions is entered from the operation unit, the light-emission control unit the inverter circuit so as operates to:
turn off the light-emitting parts disposed between the two or more adjacent heating coils;
turn on the light-emitting parts associated with the heating coil on which the target heating object is placed and
blink the light-emitting parts other than the turned off light-emitting parts of the side on which the target heating object is not placed and
the heating control unit controls the inverter circuit to supply no power to the rest of the two or more adjacent heating coils on which the target heating object is not placed.

5. The induction cooking device according to claim 1,
wherein the control unit transfers from the heating area sequential display mode to the heating mode in which heating operation in accordance with the command received from the operation unit is performed when the command to heating coils is received from the operation unit during the heating area sequential display mode.

6. The induction cooking device according to claim 1, wherein the control unit turns on only the light-emitting parts provided near the outer circumference of the heating coil of the outer side, out of the two or more heating coils, when illuminating the vicinity of the outer circumference of the two or more heating coils composed to be concentric in the center.

7. The induction cooking device according to claim 1, wherein the operation unit includes a demo mode setting unit, and the control unit determines to supply no power to the heating coils when the demo mode is set by the demo mode setting unit before the power of the main body is turned on, even if the command is entered from the operation unit after the power is turned on.

8. The induction cooking device according to claim 1, wherein the heating area sequential display mode sequentially operates such that the second illumination mode follows the first illumination mode.

9. The induction cooking device according to claim 1, wherein the heating area sequential display mode sequentially operates such that the first illumination mode follows the first illumination mode.

* * * * *